United States Patent
Greif et al.

(10) Patent No.: US 9,068,311 B2
(45) Date of Patent: Jun. 30, 2015

(54) SYSTEM AND METHODS FOR BYPASSING AN AQUATIC OBSTRUCTION

(71) Applicant: Mead and Hunt, Inc., Madison, WI (US)

(72) Inventors: Ryan Greif, Sacramento, CA (US); Stephen R. Sullivan, Sacramento, CA (US); Gilbert Frank Ransley, Madison, WI (US)

(73) Assignee: Mead and Hunt, Inc., Madison, WI (US)

( * ) Notice: Subject to any disclaimer, the term of this patent is extended or adjusted under 35 U.S.C. 154(b) by 0 days.

(21) Appl. No.: 13/789,393

(22) Filed: Mar. 7, 2013

(65) Prior Publication Data

US 2013/0236249 A1      Sep. 12, 2013

Related U.S. Application Data

(60) Provisional application No. 61/607,753, filed on Mar. 7, 2012.

(51) Int. Cl.
    *E02B 8/08*          (2006.01)

(52) U.S. Cl.
    CPC .. *E02B 8/08* (2013.01); *E02B 8/085* (2013.01)

(58) Field of Classification Search
    CPC ............ E02B 8/08; E02B 8/085; A01K 61/00
    USPC ..................................... 405/81–83
    See application file for complete search history.

(56) References Cited

U.S. PATENT DOCUMENTS

| | | | | | |
|---|---|---|---|---|---|
| 2,174,657 | A | * | 10/1939 | Helsel | 405/83 |
| 2,683,969 | A | * | 7/1954 | Mugnier | 405/83 |
| 3,596,468 | A | * | 8/1971 | Fairbanks | 405/83 |
| 3,938,340 | A | * | 2/1976 | Downs | 405/83 |
| 4,199,453 | A | * | 4/1980 | McCawley et al. | 210/160 |
| 4,431,340 | A | * | 2/1984 | Truebe et al. | 405/82 |
| 4,437,431 | A | * | 3/1984 | Koch | 405/83 |
| 4,629,361 | A | * | 12/1986 | Zimmerman | 405/83 |
| 5,433,554 | A | * | 7/1995 | Minakami et al. | 405/81 |
| 5,558,462 | A | * | 9/1996 | O'Haver | 405/81 |
| 5,660,499 | A | * | 8/1997 | Bethune | 405/83 |
| 5,947,640 | A | * | 9/1999 | Connors | 405/83 |
| 6,325,570 | B1 | * | 12/2001 | Pohjamo | 405/81 |
| 6,347,908 | B1 | * | 2/2002 | Safwat | 405/81 |
| 6,394,699 | B1 | * | 5/2002 | Neufeld | 405/81 |
| 6,832,578 | B2 | * | 12/2004 | Odeh | 119/219 |
| 6,988,853 | B1 | * | 1/2006 | Kuntz | 405/96 |
| 7,249,915 | B2 | * | 7/2007 | Tucker | 405/82 |
| 7,708,494 | B2 | * | 5/2010 | McLaughlin | 405/81 |
| 8,262,317 | B1 | * | 9/2012 | Jensen | 405/83 |
| 8,282,836 | B2 | * | 10/2012 | Feher | 210/747.5 |
| 8,550,749 | B2 | * | 10/2013 | Millard | 405/83 |
| 8,641,892 | B2 | * | 2/2014 | Winther et al. | 210/155 |
| 2003/0198516 | A1 | * | 10/2003 | Bryan | 405/81 |
| 2004/0213635 | A1 | * | 10/2004 | Boylan | 405/83 |
| 2005/0074289 | A1 | * | 4/2005 | Tucker | 405/81 |
| 2009/0317191 | A1 | * | 12/2009 | Jang et al. | 405/81 |
| 2011/0280662 | A1 | * | 11/2011 | Millard | 405/81 |

* cited by examiner

*Primary Examiner* — Benjamin Fiorello
(74) *Attorney, Agent, or Firm* — Valauskas Corder LLC

(57) ABSTRACT

The system and methods of the present invention selectively permit aquatic organisms to bypass an obstruction, such as a lock or a dam. Certain embodiments of the system include a container through which aquatic organisms and water may flow, a container pressurizer for pressurizing the container, and a pressure control mechanism.

20 Claims, 17 Drawing Sheets

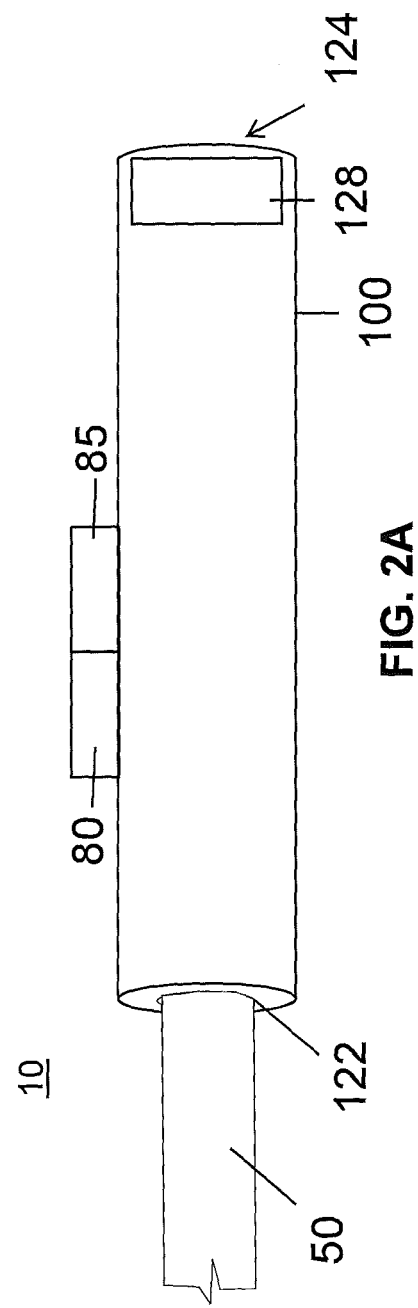

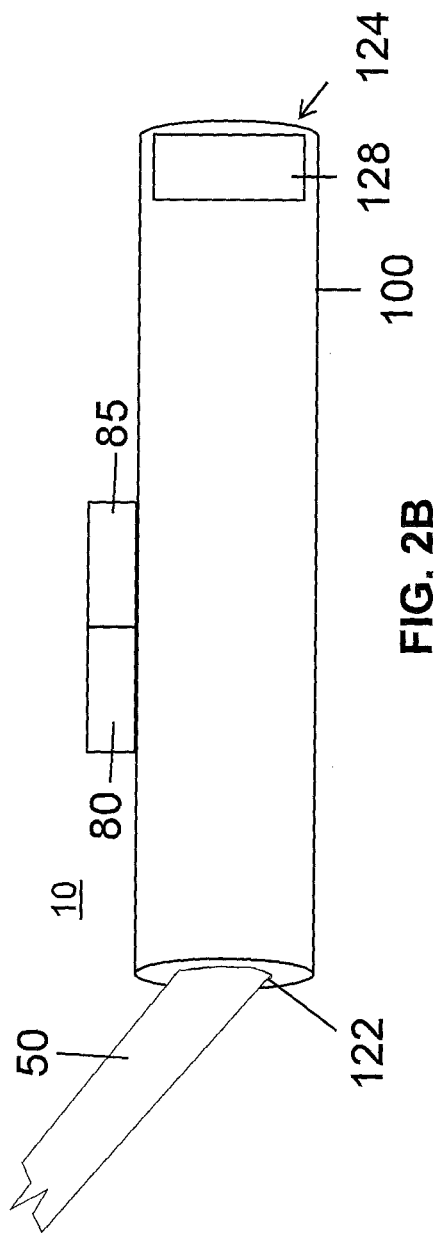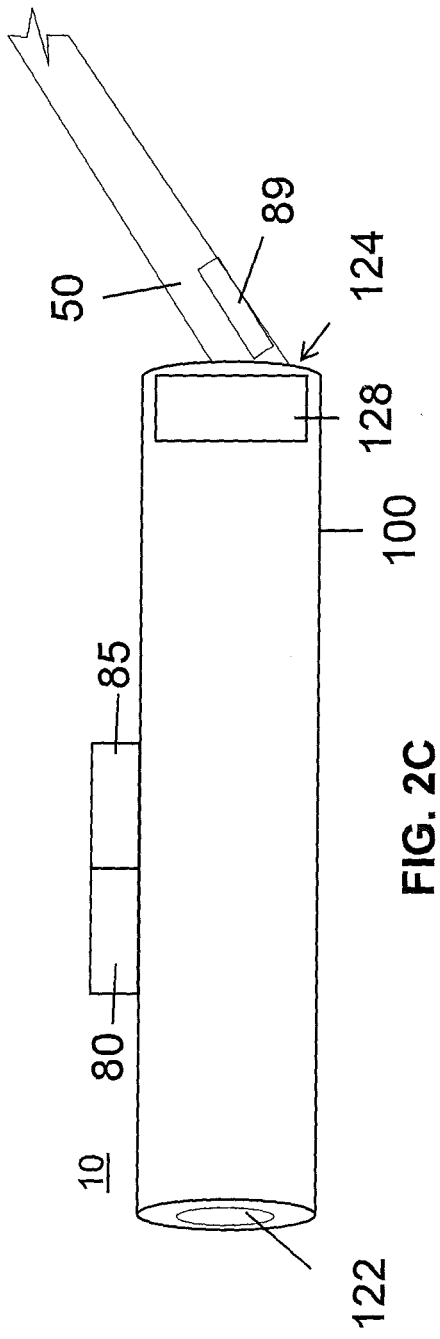

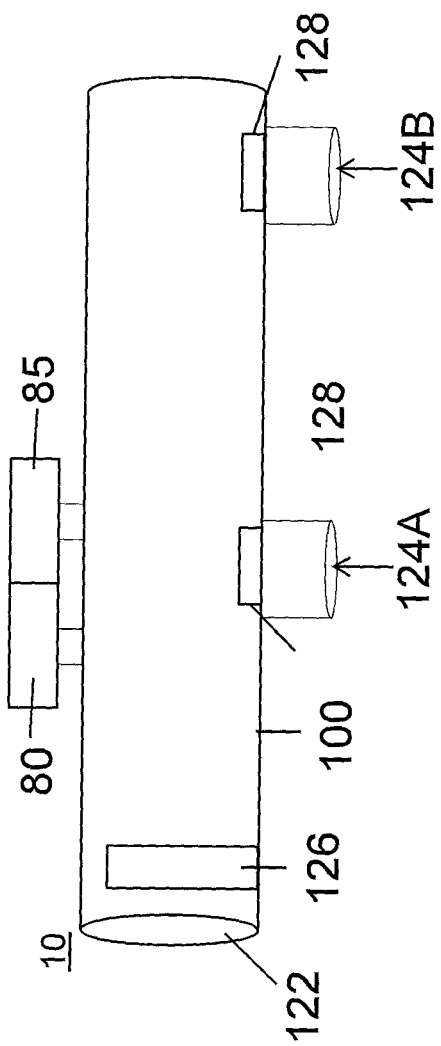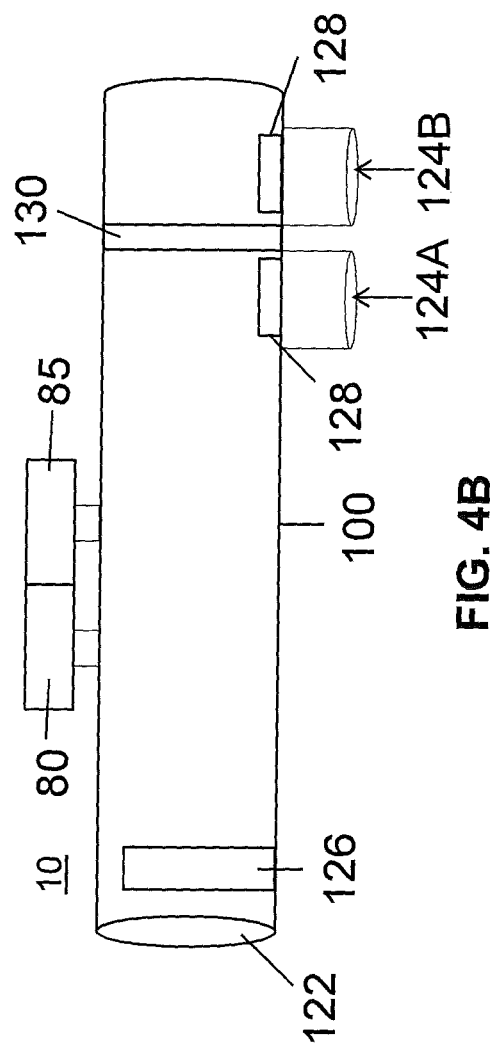

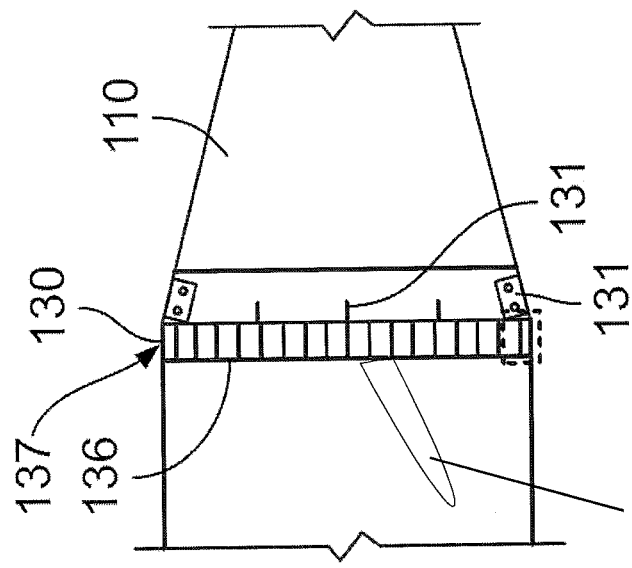
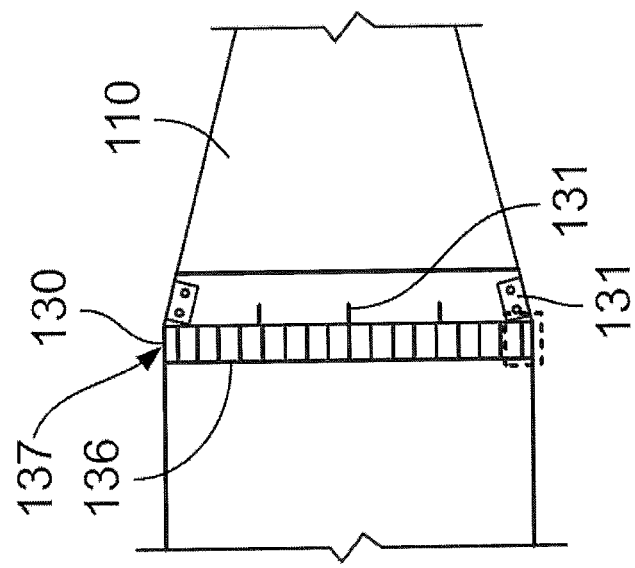

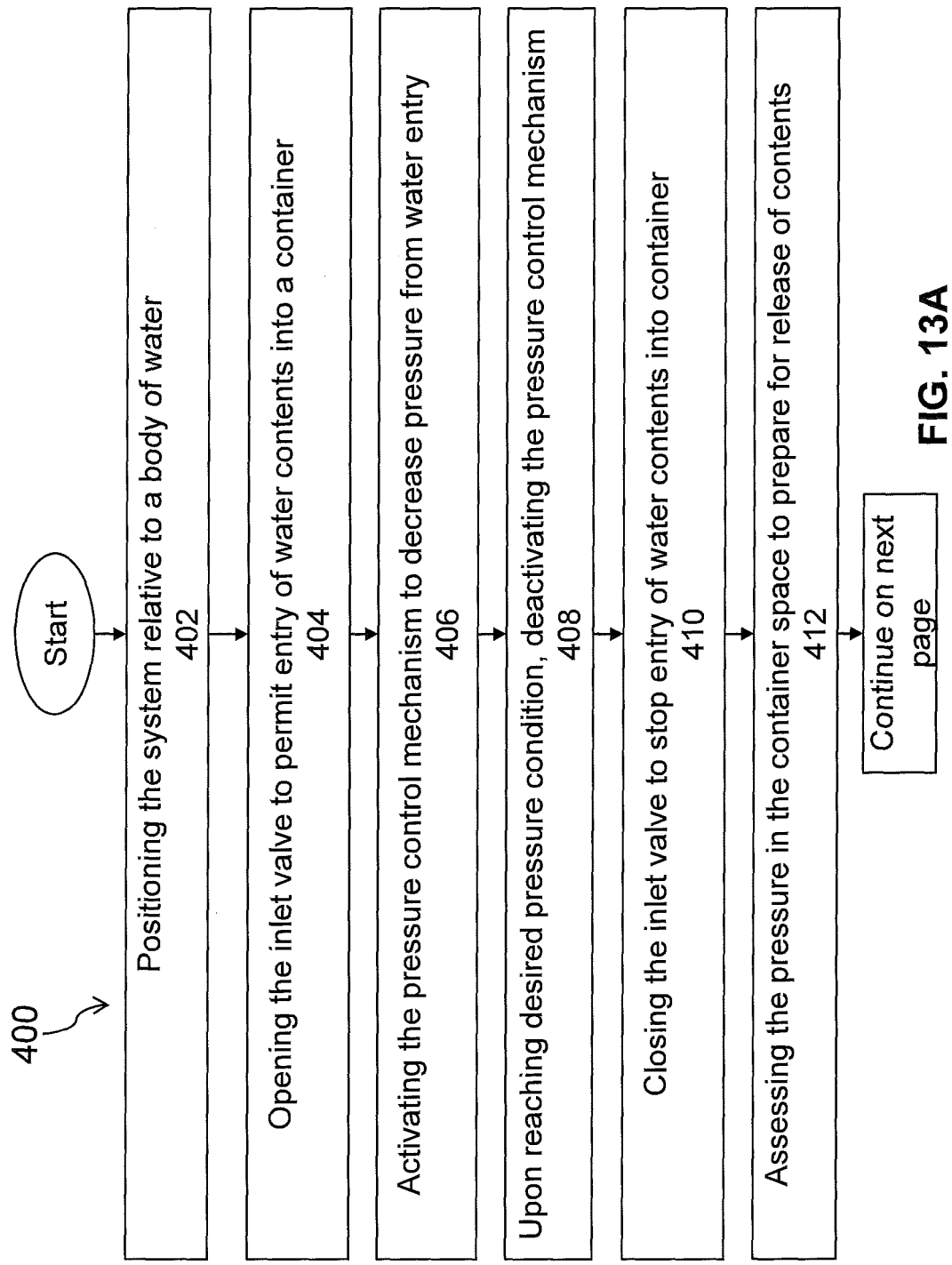

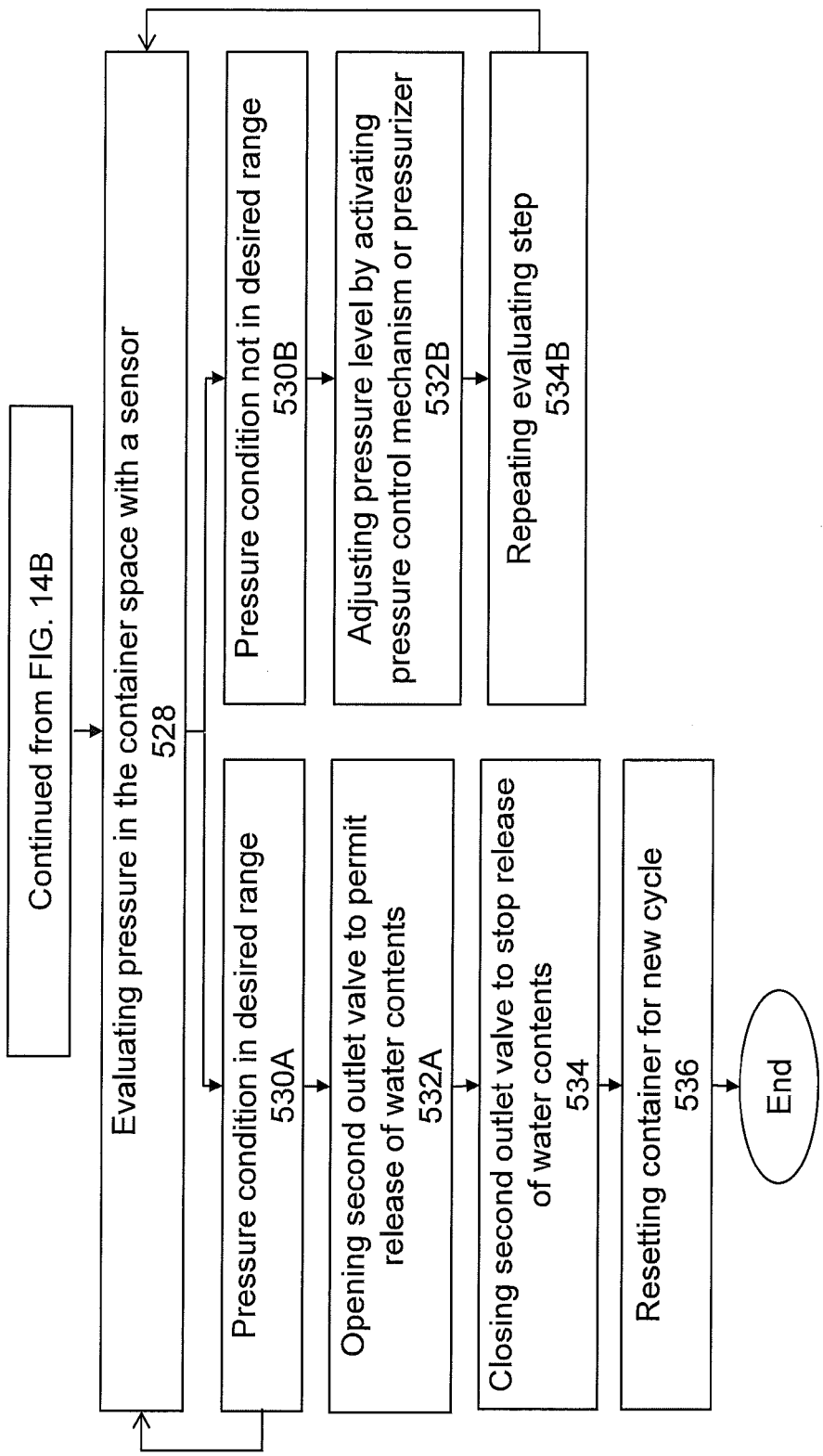

SYSTEM AND METHODS FOR BYPASSING AN AQUATIC OBSTRUCTION

FIELD OF THE INVENTION

The present invention relates generally to a system and methods for facilitating the movement of organisms around an obstruction. More specifically, the present invention is directed to a system and methods for permitting aquatic organisms to move around an aquatic obstruction such as a lock or dam.

BACKGROUND OF THE INVENTION

Bodies of water are used for many purposes including, for example, transportation, electricity generation, waste management, agricultural, industrial, or domestic water supply, or recreation. Bodies of water are often managed, regulated, or altered to permit or enhance these uses.

Conventional modifications to bodies of water or surrounding area may include bridges, beaches, buildings, quarries, aqueducts, water intake piping, dams that retain or contain water, levees that prevent water from flowing into a specific region, canals that connect one or more bodies of water, locks that permit raising and lowering of boats between stretches of water on different levels, water-powered electricity facilities, sewage treatment facilities, or water treatment facilities, to name a few.

Many such conventional modifications to water bodies change the conditions for the organisms that live in or near those water bodies. Such modifications that include physical structures in or around the water are termed "obstructions" for purposes of this application. Some such obstructions restrict or alter the movement or natural migratory routes of certain organisms. For example, certain fish migrate to find a suitable habitat for reproduction, protection, offspring, finding food, avoiding predators, increasing or decreasing exposure to light, finding water of a particular temperature, or other.

To facilitate fish migration and thereby lessen the deleterious effect an obstruction may have, many aquatic obstructions are built to include or are retrofitted to include a fish passageway around the obstruction. Certain disadvantages are associated with known passageways. For example, certain known fish passageways include an enclosure having no pressure regulation. Such embodiments may require fish to endure abrupt transitions from high-pressure environment to low-pressure environment or low-pressure environment to high-pressure environment or through high-pressure passageways, which may result in harm to the fish. Other known fish passageways regulate the pressure in the enclosure such that the transition is less abrupt. However, such pressure-regulating passageways often require substantial changes in vertical position of the fish within the enclosure. Such changes in vertical position may require construction of prohibitively large and expensive structures.

In addition, certain known fish passageways include an enclosure in which the speed and velocity of water flow in the passageway is uncontrollable. In such passageways, the uncontrolled water flow may reach high water flow speeds, which increases the risk of harm to the fish.

Still other known fish passageways include an enclosure that permits passage of any and all types of fish and any and all water contents at the same time. Examples of such fish passageways include a fish ladder or a fish elevator. A typical fish ladder is a structure that permits fish to swim up, jump up, or pass down a series of relatively low steps and eventually into the water on the other side. A fish elevator includes an enclosure into which water contents enter, and the water level and all of the water contents are raised or lowered to clear the obstruction.

Certain disadvantages are associated with fish ladders and fish elevators. Construction of fish ladders and fish elevators at high-head dams often requires construction of large, expensive structures, which may be prohibitively expensive for smaller capacity hydroelectric projects. Small fish may pass through the enclosure at the same time as larger predatory fish, which puts the small fish at risk of harm.

Accordingly, there is a demand for a reduced cost system and methods that permits controlling pressure and water flow through an environment positioned to transition fish and other aquatic organisms around an aquatic obstruction. The present invention satisfies this demand.

SUMMARY OF THE INVENTION

The system and methods of the present invention may be used in any body of water including, for example, oceans, seas, rivers, lakes, ponds, streams, canals, channels, tributaries, etc. However, for purposes of this application, the present invention will be discussed in reference to embodiments configured to be positioned in a river.

For convenience of description, terms such as "above", "below", "upper", "lower", "outer", "inner", "horizontal", and "vertical" are used to refer to the system and the components of the system in an orientation illustrated in the accompanying drawings. However, it will be understood that the embodiments of the invention described in this application advantageously can be used in a variety of orientations.

In certain embodiments, the system is configured for use in an aquatic environment such that some or all of the system components are partially or completely submerged in river water. River water may include water, aquatic organisms, rocks, soil, pollution or debris, and other elements typically found in bodies of water, which collectively will be termed "water contents", for purposes of this application.

Certain aspects of the present invention will be discussed by referring to the benefits to fish. However, many aspects of the present invention also provide known benefits to other organisms and other parts of an aquatic ecosystem.

Generally, embodiments of the present invention are configured to minimize harm to fish during movement around an aquatic obstruction. More specifically, embodiments of the present invention are configured provide a cost-efficient manner of managing the pressure within a container to permit transition of water contents in a pressure-regulated environment. Certain embodiments of the present invention also are configured to regulate or control the flow—or, in other words, kinetic energy—of the water in which the fish are positioned during the transition.

Certain preferred embodiments of the present invention are comprised of a container having container openings, a container pressurizer, and a pressure control mechanism.

A container is formed from one or more container walls. Each container wall may include an outer container wall and inner container wall. An inner container wall defines a container space generally configured to retain water contents. Certain embodiments of a container may be configured to permit the flow of water contents through the container space, for example, from a first area to a second area of the container space. A container may be positioned at any elevation relative to the obstruction.

Certain embodiments of a container wall may include one or more container openings configured to permit the passage of air and water into or out of the container, and each container opening is defined by a container rim. In certain embodiments, container openings may be positioned at or near the first end area of the container space and at or near a second end area of a container space. Such container openings are termed a "first end container opening" and "second end container opening" for purposes of this application and the respective container rims that define each are termed the "first end container rim" and the "second end container rim".

In certain embodiments, a first end container opening is configured to permit the entry of water contents. Any container opening configured to permit the entry of water contents or some components of water contents is termed an "inlet" and a rim defining an inlet is termed an "inlet rim" for purposes of this application.

A second end container opening may be sized and shaped to permit the controlled release of the water contents. Any container opening configured to permit the controlled release of water contents is termed an "outlet" and a rim defining an outlet is termed an "outlet rim" for purposes of this application. Certain embodiments of an outlet and outlet rim are sized and shaped to influence the direction of flow of the water contents out of the outlet. In certain embodiments, a director component is attached to the outlet rim and is configured to influence the direction of flow of water contents out of the outlet.

In certain embodiments, an outlet valve may be positioned relative to the outlet such that the outlet may enter an open state or a closed state. Outlet valves, and all other container valves in the system of the present invention, are configured to permit a user to manage the volume of liquid that can pass through the opening. A valve may attain have an open setting or a closed setting. In an open setting, a valve permits the passage or increased passage of air or water contents through the opening. In a closed setting, a valve permits the blockage or decreased passage of air or water contents through the opening. Certain embodiments of a valve may be able to enter a number of semi-open settings such that a user may control how much water or air may pass through an opening. Certain embodiments of a valve may be configured to be bubble tight such that the valve in a closed position permits as little water or air through the opening as possible according to industry standards.

Certain embodiments of a valve may include a butterfly valve, ball valve, ceramic disc valve, check valve, choke valve, diaphragm valve, gate valve, globe valve, needle valve, pinch valve, piston valve, plug valve, poppet valve, spool valve, thermal expansion valve, pressure reducing valve, sampling valve, safety valve, square knife gate valve, or any other valve that permits a user to open or close an opening.

Certain embodiments of a container pressurizer are configured to pressurize the container space and produce or maintain a raised pressure environment within the container. A container pressurizer is positionable to meet with or attach to a container wall including a container rim or other part of a container wall. A container pressurizer may include a water standpipe, a pressure vessel with hydraulic fluid, a piston and cylinder device, another type of pressure vessel, or an air chamber. Although an embodiment of an air chamber will be described in detail, any other embodiment of a container pressurizer that is capable of producing or maintaining a raised pressure environment within the container is contemplated.

Certain embodiments of a present invention include an air chamber formed from a container wall. In other embodiments, an air chamber is a component separable from a container. An air chamber may include an air chamber wall that defines an air chamber space. An air chamber wall may include air bleedoff openings, each defined by an air chamber rim. An air chamber rim may be sized and shaped to meet with or attach to a container rim. An air chamber rim and a container rim may be positioned relative to each other such that the air bleedoff opening and the container opening are continuous and permit movement of air or water between the container and the air chamber. In certain embodiments, an air chamber valve may be positioned relative to an air bleedoff opening such that the air bleedoff opening may be positionable in an open state or a closed state.

In embodiments in which an air chamber rim and a container rim are configured to attach to one another, such attachment may be formed by an attachment element such as welding, screws, rivets, nuts, bolts, snaps, complementary components, adhesives, seal, neoprene seal, gasket, or a means of permitting a generally airtight connection known in the art. In certain embodiments, an air chamber rim may include an air chamber flange and a container rim may include a chamber flange. A container flange and an air chamber flange may be sized and shaped to facilitate secure attachment between the flanges.

In certain embodiments, an air chamber may be configured and positioned in accord with relevant American Society of Mechanical Engineers (ASME) codes and standards or other relevant safety standards. Certain embodiments of the air chamber may include an end cap sized and shaped to cover an air bleedoff opening or an air chamber wall. Such end caps may include a head sized and shaped to handle various pressure conditions that may occur in the air chamber space. Certain embodiments of a head may include an ellipsoidal head (also termed a "2:1 elliptical head"), hemispherical head, torispherical head, flat head, diffuser head, or conical head.

Certain embodiments of the present invention include a pressure control mechanism configured to permit control of the level of pressure in the container space. A pressure control mechanism may include an air bleedoff element, a water discharge element, a hydraulic cylinder, or a compressor element.

Certain embodiments of an air bleedoff element may include an air bleedoff opening and an air bleedoff valve. An air bleedoff opening may be a container opening configured to permit release of air from the container space or air chamber space. An air bleedoff valve may be positioned relative to an air bleedoff opening to permit the air bleedoff opening to enter an open state or a closed state. For purposes of this application, the air bleedoff opening is "activated" when in an open state and "deactivated" when in a closed state.

Certain embodiments of a water release element include a water release opening and a water release valve. A water release opening may be a container opening configured to permit release of water from the container space or air chamber space. A water release valve may be positioned relative to a water release opening to permit the water release opening to be positionable in an open state or a closed state. A water release element is configured to permit release of water for the purpose of pressure control and not for safely releasing fish from the container, the latter of which is the purpose of an outlet and outlet valve. For purposes of this application, the water release opening is "activated" when in an open state and "deactivated" when in a closed state.

A compressor element is configured to compress or decompress the air stored in the air chamber or container space. A compressor element may be attached to the container rim via an attachment element. For purposes of this application, a compressor is "activated" when it is functioning to compress or decompress air and is "deactivated" when it is not functioning.

Certain preferred embodiments of the system of the present invention include a selector unit. A selector unit may be configured to permit separation of certain water contents. In such an embodiment, a certain portion of the water contents may be expelled through an outlet positioned to expel the water contents into the body of water, and a second portion of the water contents may be expelled into a receiving basin. A selector unit may also separate out certain water contents by size such that the water contents may be released selectively by size. A selector unit may include a separator and a plurality of outlets and outlet valves.

Certain embodiments of a separator may be configured to selectively permit passage of certain water contents. A separator may include a physical barrier, an energy barrier, or other selective means of separating water contents. A physical barrier separator may permit passage of relatively smaller sized components of water contents and not permit passage of relatively larger sized components of water contents. A separator may include shaped surfaces including linear-shaped surfaces, conical-shaped surfaces, cylindrical-shaped surfaces, or another shaped surface configured to select for specific part of the water contents. Certain embodiments of an energy barrier include an electrical barrier (which emit, e.g., electricity) and a sound barrier (which emit, e.g., sonic vibrations). Separators may permit selective passage of certain water contents based on the size, shape, speed, or other attribute of the organism.

Certain separator embodiments may be configured to be positionable in an effective state and an ineffective state. In an effective state, a separator functions to select water contents and maintain its separation from another portion of water contents. In an ineffective state, a separator does not function to separate water contents. In such an ineffective state, a physical barrier may be retracted into a pocket of the container or may be movable or adjustable in position. A sound barrier separator may be capable of turning on or turning off the emission of sound waves.

In addition, certain embodiments of a physical barrier separator may be configured to comply with National Marine Fisheries Service standards and criteria for "fish screens" or other relevant industry standards. The separator also may be configured in line with site-specific conditions in which the system will be implemented. Such site-specific conditions may include size of aquatic organisms present at the site, temperature of the water at the site, dissolved oxygen concentration in water at the site, light intensity at the site, depth of water at the site, or other conditions. Certain embodiments of a physical barrier separator may include a filter, screen such as a slotted screen, a perforated screen, or a mesh screen, sieve, bar rack, or strainer arrangements. In certain embodiments, the separators may be configured to permit the passage of certain organisms. Certain embodiments of a container may include more than one separator.

Certain embodiments of a separator may be positioned relative to a first outlet such that components of the water contents that cannot pass through the separator may exit the container through a first outlet. In such embodiments, the container may include a second outlet on the other side of the separator such that components that may pass through the separator may be released from the container via that second outlet. In other embodiments, the water contents on both sides of the separator are released through the same outlet. In such embodiments, the separator or portion of the separator may be movable such that the contents on one side of the separator have access to the outlet at a different time than the contents on the other side of the separator.

Certain preferred embodiments of the system of the present invention include an organism storage area. In certain embodiments, a separator may be positioned to form an organism storage area within the container space, generally, a compartment formed within the container space by container wall and one or more separators. An organism storage area may be sized and shaped to permit storage of a single organism or many organisms. An organism storage area also may be sized and shaped to permit storage of debris, pollution, or other water contents.

Certain preferred embodiments of the system of the present invention include a flow control element. A flow control element is configurable to permit control of the water flow through the container space. In certain embodiments, a flow control element permits gradual decrease in water flow rate along the length of the container from the inlet to the outlet. A flow control element may include multiple flow-regulating outlets along the length of the container with each outlet including a flow-regulating valve, one or more container openings configured as small pores to permit water to be skimmed off, or a specific container or container section configuration. Such a container configuration may include a container wall forming a relatively small container space near the inlet and a relatively larger container space near the one or more outlets. Certain embodiments of such a container wall may be shaped such that the container space gradually widens. In other embodiments, the container wall may be shaped such that the container space widens sharply at one or more points. A container or container section also may be positioned at an angle such that gravity assists in slowing down the flow of water contents.

Certain preferred embodiments of the system of the present invention include a light entry component. In certain embodiments, a light entry component is configured to permit light to enter the container space. A light entry component may include a transparent container wall or a transparent coverage component. A light entry component may be comprised of a material having transparent, translucent, or semi-transparent qualities such that ambient light may pass through the coverage component and enter the container space. A light entry component may be configured to facilitate achieving certain light conditions in the container space for specific aquatic organisms or for a specific process. Certain embodiments of a light entry component may be configured such that different light conditions may be created in different portions of the container space. A transparent coverage component may be attachable to the container rim to cover a container opening.

Certain embodiments of the present invention also may include an artificial light source to provide light to the container space. An artificial light source may include an LED, a light bulb, or other known artificial light source configurable to be positioned in an aquatic environment.

Certain preferred embodiments of the system of the present invention include a washing component. A washing component positioned to clean a separator or another part of the system may be configured to emit water and/or a cleaning solution. A washing component also may include a mechanical brushing system. In certain embodiments, the washing component may include a washing control element such that the timing, amount, direction, or type of emission may be controlled by the user. A washing component may be positioned to permit cleaning of a separator since debris, microorganisms, or other undesirable items may be connected to, caught on, or grown on the separator.

Certain preferred embodiments of the system of the present invention include an instrument component. Instrument components may include any instrument known in the art that is configured to assess or monitor conditions within the system, the operation of the system, or the position of the system. For example, certain embodiments of an instrument component may be configured to measure or indicate pressure in the container space or other space. Other embodiments of an instrument component are configured to measure pressure differential, mass, temperature, volume, color, clarity, pH, total level of dissolved oxygen, total level of dissolved gasses, or other qualities of the water or water contents. Still other embodiments of an instrument component are configured to measure light conditions in the container space, the position of particular valves (e.g., whether they are in the closed setting or open setting), the position or efficacy of separators, the stage of the method (e.g., receiving water contents, releasing water contents, assessing water contents, cleaning), or other measurement related to the system and method according to the present invention. An instrument component also may include an object identifier configured to identify whether fish or debris are present in a particular location, a fish counter known in the art, or a camera configured to capture images such as pictures or videos of the water contents.

In certain embodiments, instrument components may include a display element to permit display of the measurement or indication. An instrument component may include a processor element capable of processing information. An instrument component may include a communication element configured to permit sending or receiving information such as measurements or instructions to or from a remote unit. A remote unit may include a computer, a smartphone, a personal digital assistant, or anything else known in the art that is capable of receiving information.

A system may include any number of instrument components. In certain embodiments, one or more instrument components are attached to the inner container wall, outer container wall, or separator, via an attachment element. In other embodiments, an instrument component is attached to another element in the system.

Certain preferred embodiments of the system of the present invention include a controller component. Certain embodiments of a controller component may be configured to control the movement or activity of one or more parts of the system. For example, a controller component may be capable of causing a valve to be positionable in a closed setting or an open setting, causing a separator to have a different angle relative to the container, or causing a cleaning solution to be emitted from the washing component (the "washing control element" described above is an embodiment of a controller component). Controller components may be configured to communicate with other elements of the system such as a remote unit or an instrument component. In certain embodiments, a controller component may be configurable to automatically cause a change in a system component. Such a change may be in response to one or more triggers such as time intervals, receipt of selected information, or detection of certain conditions in the system. Certain embodiments of controller components permit automation of changes in the system, e.g., opening and closing of valves, moving separators.

In certain embodiments, a controller component includes more than one controller element. In such embodiments, a controller component may include a first controller element and a second controller element. In such embodiments, the first controller element may be positioned relative to a system component such that it may directly cause movement of that component. The second controller element may be positioned to be easily accessible to a user such that the user may enter certain commands to cause movement of the system component. The first controller element and second controller element are configured to send and receive information such as signals to one another. In other embodiments, a first controller element and a second controller element are physically connected to one another such that a user may cause a change in a system component by manually actuating the second controller element.

Certain preferred embodiments of the system of the present invention include more than one container. Each container may include an inlet and an outlet, each outlet including an outlet valve, and each container including a container pressurizer and a pressure control mechanism. Such embodiments may be configured to permit continuous or semi-continuous use of the containers. In such embodiments, any container other than the first container may substitute for the first container if the first container is malfunctioning or under repair. In certain embodiments that include multiple containers, each container alternates in operation such that one or more containers are configured to be able to receive water contents while another container is pressurizing or depressurizing and releasing water contents.

Certain preferred embodiments of the system of the present invention include an access component. Access components may be configured to permit a person to access different portions of the system for inspection or maintenance. For example, the outer container wall may include one or more protrusions or indents, each of which may be used as handles for gripping or steps that may be used as footholds. Another embodiment of an access component includes a walkway positioned between a primary container and a secondary container.

Certain preferred embodiments of the system of the present invention include a conduit. A conduit may be positioned to deliver water contents to the inlet of the container or move water away from the outlet of the container. A conduit may include a conduit wall configured to partially enclose or completely enclose water contents and to permit water contents to be transferred from the river into the container or from the container to the river. Certain embodiments of a conduit may include a tube having a tube wall in a generally cylindrical shape or any other shape to maximize flow of pressurized or non-pressurized water contents. The tube wall includes a first tube opening located near a first end and a second tube opening located near a second end. The second tube opening may be configured to meet with or attach to a container opening, such that the container may receive the water contents. In certain embodiments, a tube includes a tube valve positioned relative to a first tube opening such that the first tube opening may be openable to increase or permit the passage of air or water contents and closed to decrease or block the passage of air or water contents. In embodiments having more than one container, one or more tube valves may be opened or closed to control which containers may receive water contents.

Certain preferred embodiments of the system of the present invention are configured to permit one container to receive water contents from two or more sources. Such sources may include, for example, a filtered source and a non-filtered source. A filtered source may include a penstock, water-holding unit, or any other source in which water is contained and may be filtered or treated before entering the container. A non-filtered source may include a body of water that is not filtered or treated for purposes related to the present invention system and methods. Such embodiments of a system may include a container including an inlet and an outlet, a container partition wall, an outlet valve, a container pressurizer, and a pressure control mechanism.

A container may include a container partition wall positioned in the container space, which forms a first container area and a second container area such that the contents of a first container area may be kept apart from the contents of a second container area. In certain embodiments, the first container area and second container area include a shared space such that the contents of each area may be combined in certain circumstances. In certain embodiments, a separator may be positioned in the shared space above the container partition wall such that only water contents that can pass through the selectively permeable surface of the separator will pass from one container area to another container area. In certain embodiments, a valve is positioned to permit controlled movement of water contents between a first container area and a second container area. Such a valve may be termed a "flow regulating valve" for purposes of this application.

In certain embodiments, the first container area and second container area are configured to maintain the contents of each separately. Such embodiments may include a container partition wall. A container partition wall also may include a gap and a gap door. A gap door is configured to be selectively closable or openable such that, in the closed state, the gap door blocks the combination of the contents in the two areas, and in the open state, the gap door permits combination of the contents in the two areas.

In embodiments having a first container area and a second container area, each container area may have an inlet, each of which are termed a "first inlet" and a "second inlet", respectively, for purposes of this application. Each of a first inlet and a second inlet may be configured to include a valve, which are termed a "first inlet valve" and a "second inlet valve", respectively, for purposes of this application.

In embodiments having a first container area and a second container area, each container area may have an outlet, each of which are termed a "first outlet" and a "second outlet", respectively, for purposes of this application. Each of a first outlet and a second outlet may be configured to include a valve, which are termed a "first outlet valve" and a "second outlet valve", respectively, for purposes of this application.

Certain preferred embodiments of the system of the present invention include a receiving basin. Certain embodiments of a receiving basin may be positioned relative to an outlet to receive the released water contents. Certain embodiments of a receiving basin may be configured to permit receiving and storage of water contents. Such embodiments may facilitate evaluation, collection, or separation of water contents. Certain embodiments of a receiving basin may include a receiving basin wall, which may be configured to form a compartment.

Certain embodiments of a receiving basin may include one or more basin divider walls such that the compartment may be divided into two or more compartment areas. Such embodiments may include a first compartment area, second compartment area, third compartment area, or any number of compartment areas. Certain embodiments of a receiving basin that include more than one compartment areas may be positioned such that each compartment area is positioned to receive water contents released from a different outlet of the container. In other embodiments, one compartment of a receiving basin may be positioned to receive water contents from more than one outlet of the container.

In certain embodiments, a receiving basin includes a depth-managing component configured to permit a consistent water depth to be achieved in the container during variations in water flow. Such variations in water flow may result from adding to or releasing water contents from the container. A depth-managing component may include an alterable plate component, weir, or any other component known in the art to manage the depth of water in a container.

Certain embodiments of the system and methods of the present invention do not include a receiving basin. In such embodiments, the water contents may be released directly from the outlet into the river.

Certain preferred embodiments of the system of the present invention include a stable base structure and support elements. Certain embodiments of a stable base structure may include an obstruction, blocks embedded in a river bottom, or any other structure capable of forming a foundation on which the system of part of the system may be mounted. In certain embodiments, any component of the system including a container, receiving basin, or air chamber may be connected to a stable base structure via one or more support elements. In certain embodiments, one or more components such as an air chamber may be connected to a stable base may be directly attached to the container and only indirectly connected to the stable base structure.

Certain embodiments of support element may include a beam, rod, shaft, adhesive, clip, clasp, slide, or first complementary component paired with a second complementary component, to name a few. A support element may be connected to container via container connectors and connected to the stable base structure via base connectors. A container connector may be an adhesive, screw, nail, bolt, nut, rivet, tie, welding, or anything else configured to connect a support element to other components of the system of the present invention.

Certain embodiments of the methods of the present invention include one or more of the following steps. The following steps may be completed by a person using the system or the steps may be automated, controlled by a remote unit, triggered upon certain events, or any combination of the above.

A first inlet valve may be positioned in an open setting to permit water from a filtered source to enter a first container area. The entry of water causes an increase in water volume and pressure in the container space or air chamber space. Then, an assessment may take place to ascertain whether to cause a valve such as an air bleedoff valve positioned to release air from container or air chamber positionable in an open state. If necessary to permit water from a filtered source to continue to enter a first container area, an air bleedoff valve is positioned in an open setting. When water reaches desired level in the first container area, an air bleedoff valve may be positioned in closed setting such that air does not enter or exit the chamber space through that opening. Upon equalizing pressure between chamber space and space in filtered source, the first inlet valve may be positioned in a closed setting such that water is generally blocked from entering the first container area. In certain embodiments, water that entered the first container area may be routed to the washing component for use in washing system components.

Next, a conduit valve may be positioned in an open setting to permit water contents to enter conduit from non-filtered source. A second inlet valve may be positioned in an open setting to permit water contents in the conduit to enter second container area. As more water contents enter the second container area, the water contents rise and certain water contents may flow through a first separator positioned generally in the upper container space. As the water contents continue to rise, any water contents that pass through the first separator may enter shared space between the first container area and the second container area. Upon causing a flow-regulating valve to enter an open setting, water contents may enter the first container area and flow through an outlet positioned and configured to release the water contents into a receiving basin. As needed to maintain the desired pressure in the system, the flow-regulating valve may be positioned in a closed setting, a semi-open setting, or an open setting.

Any water contents that cannot pass through the first separator positioned in the upper container space may continue to flow through the second container area until reaching a second separator positioned generally vertically in the container space. In certain conditions, a second outlet valve is positioned in an open setting such that any water contents that have not passed through the second separator will be released via the second outlet. After releasing any water contents that did not pass through the second separator, the second separator may be configurable to permit those contents that did pass through to pass back through the separator space and exit the container through the aforementioned second outlet. For example, a flap in the separator may be maneuverable to permit that which passed through another section of the separator to pass back through the separator space and access the second outlet. In other embodiments, one outlet is positioned on one side of the separator and another outlet is positioned on the other side of the separator such that the water contents on each side of the separator may be released through different outlets.

As necessary to decrease the pressure in the container space, an air bleedoff valve is positioned in an open setting to release pressurized air in a container such that a desired pressure such as atmospheric pressure may be obtained in the container space/air chamber space. A conduit valve and inlet valve may be positioned in a closed setting. An inlet valve in secondary container may be positioned in an open setting such that entire process may repeat in that container while water contents are being released in primary container.

One object of the present invention is to minimize harm to fish during passage by an obstruction positioned in a body of water.

Another object of embodiments of the present invention is to minimize harm to fish while transitioning fish between environments having substantially different pressures.

Another object of embodiments of the present invention is to provide a cost-efficient method transitioning fish between environments having different pressures, specifically, by decreasing the vertical fluctuation endured by the fish during that transition.

Another object of embodiments of the present invention is to minimize harm to fish during passage by an obstruction positioned in a body of water by controlling the flow rate and velocity of the water passing through a container.

Another object of embodiments of the present invention is to minimize harm to fish during passage by an obstruction positioned in a body of water by permitting ambient light to enter a container through which the fish pass.

Another object of embodiments of the present invention is to minimize harm to fish during passage by an obstruction positioned in a body of water by providing artificial light in the container.

Another object of embodiments of the present invention is to permit control over the light conditions in the container space.

Another object of embodiments of the present invention is to selectively permit certain objects or organisms to pass by an obstruction positioned in a body of water.

Another object of embodiments of the present invention is to permit water contents of different sizes to pass by an obstruction in separate spaces such that larger fish do not have access to smaller fish.

Another object of embodiments of the present invention is to permit collection or evaluation of fish or other water components.

Another object of embodiments of the present invention is to permit continuous function of at least one container while a second container in the system may be depressurizing, cleaning, or having maintenance work done.

The present invention and its attributes and advantages will be further understood and appreciated with reference to the detailed description below of presently contemplated embodiments, taken in conjunction with the accompanying drawings.

BRIEF DESCRIPTION OF THE DRAWINGS

The preferred embodiments of the invention will be described in conjunction with the appended drawing provided to illustrate and not to limit the invention, where like designations denote like elements, and in which:

FIG. 2A is a perspective view of an embodiment a system according to the present invention including a container, a conduit configured to deliver water to the container, pressurizer, and pressure control mechanism.

FIG. 2B is a perspective view of an embodiment a system according to the present invention including a container, a conduit configured to deliver water to the container from a higher elevation, pressurizer, and pressure control mechanism.

FIG. 2C is a perspective view of an embodiment a system according to the present invention including a container, a conduit configured to carry water from the container to a higher elevation, pressurizer, and pressure control mechanism.

FIG. 4A is a perspective view of an embodiment a system according to the present invention including a container having a plurality of outlets are positioned to permit management of the water velocity, pressurizer, and pressure control mechanism.

FIG. 4B is a perspective view of an embodiment a system according to the present invention including a container having a plurality of outlets positioned to selectively permit water contents to flow out of a certain outlet, pressurizer, and pressure control mechanism.

FIG. 12A is a side view of an embodiment of a separator in which the flap component is closed;

FIG. 12B is a side view of an embodiment of a separator in which the flap component is open;

FIG. 13A and FIG. 13B illustrate a flow chart of an embodiment of the method according to the present invention; and FIG. 14A through FIG. 14C is a flow chart of another embodiment of the method according to the present invention.

DETAILED DESCRIPTION OF EMBODIMENTS OF THE INVENTION

Figure 1A:
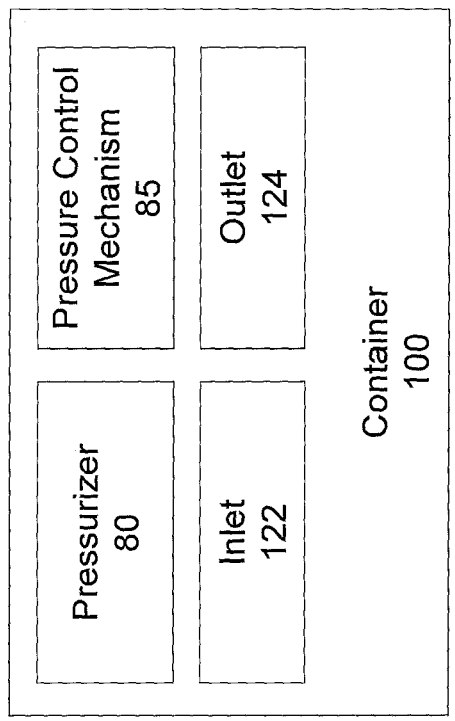
FIG. 1A is a box diagram of a container having an inlet and an outlet, a pressurizer, and a pressure control mechanism.
Figure 1B:
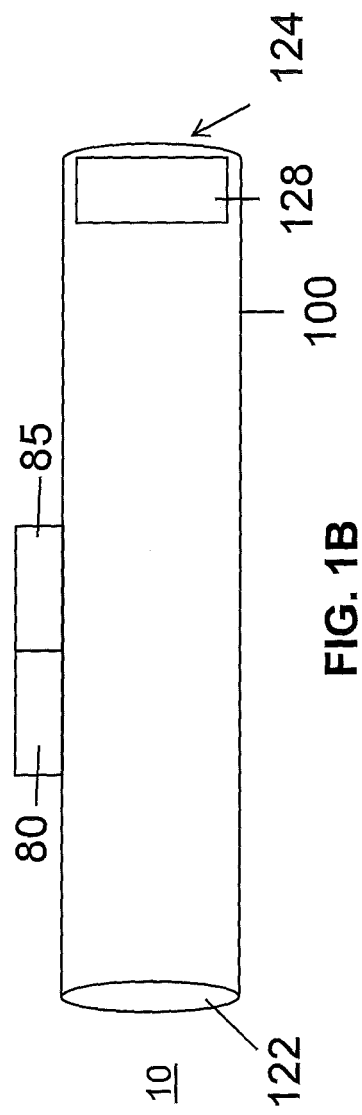
FIG. 1B is a perspective view of an embodiment of a system according to the present invention including a container having an inlet and an outlet, a pressurizer, and a pressure control mechanism.

Certain embodiments of a system 10 of the present invention may include a container 100 having an inlet 122 and an outlet 124 as illustrated in FIG. 1A and FIG. 1B. Such embodiments also include a pressurizer 80 and a pressure control mechanism 85. The pressurizer 80 may be configured to increase the pressure in the container space, for example, to an appropriate pressure for fish survival. Comparatively, the pressure control mechanism 85 is configured to permit control of the level of pressure in the container space, for example, by permitting release of air or water contents to decrease the pressure. Certain embodiments of a pressure control mechanism 85 may include an air bleedoff element, a water discharge element, a hydraulic cylinder, or a compressor element.

Certain embodiments of a system 10 of the present invention also include a conduit 50 positioned to deliver water contents to the inlet of the container or to carry water away from the container. In certain embodiments, the conduit 50 is positioned to receive water from an elevation generally equal to the elevation of the container 100 as illustrated in FIG. 2A or from an elevation generally above the position of the container 100 as illustrated in FIG. 2B. Certain embodiments may include an outlet conduit 50 positioned to carry water contents away from an outlet of the container such that the outlet conduit delivers the water contents to a generally equal elevation relative to the container 100 or an elevation generally above the position of the container 100, the latter of which is illustrated in FIG. 2C. Certain embodiments of the system 10 may include a booster pump 89 configured to facilitate moving water contents through the conduit 50 or container 100, also illustrated in FIG. 2C.

Figure 3A:
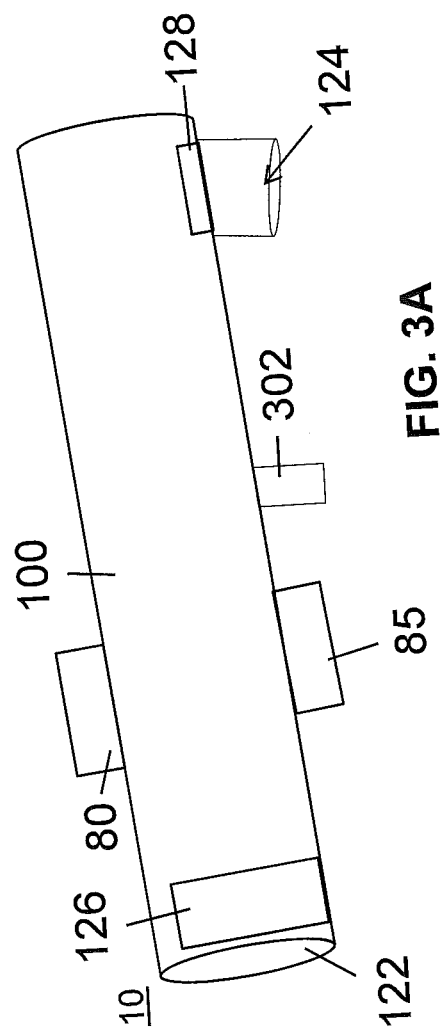
FIG. 3A is a perspective view of an embodiment a system according to the present invention including a container positioned to permit improved draining of water contents out of the container, pressurizer, and pressure control mechanism.
Figure 3B:
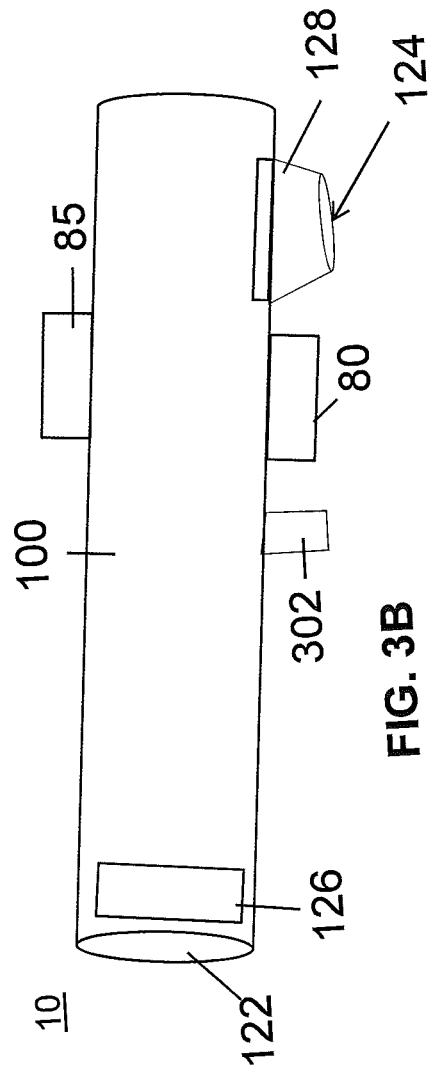
FIG. 3B is a perspective view of an embodiment a system according to the present invention including a container positioned to permit improved draining of water contents out of the container, pressurizer, and pressure control mechanism.

In certain embodiments, the container 100 may be positioned on an incline as illustrated in FIG. 3A or FIG. 3B. Such embodiment may be configured for a variety of purposes, including, for example, to permit improved draining of water contents out of the container 100. In FIG. 3A, the container 100 is positioned to drain water contents out of the inlet, and in FIG. 3B, the container is positioned to drain water contents out of the outlet.

Certain embodiments of the present invention may include more than one inlet or more than one outlet. The embodiments illustrated in FIG. 4A and FIG. 4B include a plurality of outlets including at least a first outlet 124A and a second outlet 124B. The outlets in the embodiment illustrated in FIG. 4A are configured to permit gradually decreasing the flow rate of the water contents along the length of the container. The outlets in the embodiment illustrated in FIG. 4B are configured to permit selective release of water contents through each outlet 124. Such embodiment also includes a separator 130, such as a physical barrier, an electrical barrier, a sound barrier, combined physical and sound barrier, combined physical and electrical, combined sound and electrical barrier, and any other type of barrier. The separator 130 is positioned to select for certain types of fish or water contents or to select which outlet will be used by which fish or water contents.

Figure 5:
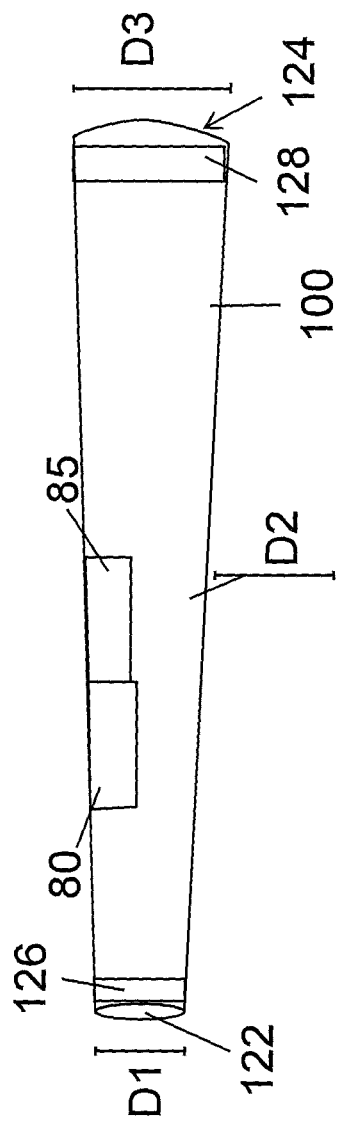
FIG. 5 is a perspective view of an embodiment a system according to the present invention including a container shaped to permit management of water velocity between inlet and outlet, pressurizer, and pressure control mechanism.

Certain embodiments of a container 100 are sized and shaped to manage the kinetic energy of the water contents. Such an embodiment may include a container 100 sized and shaped generally to increase in diameter D along the length of the container 100 to dissipate the kinetic energy along the length of the container as illustrated in FIG. 5. The increases in container 100 diameter may be gradual or may be stepwise. As illustrated in FIG. 5, a first diameter D1 measured near a first end of the container 100 is smaller than a second diameter D2 measured near the middle of the container 100. In addition, a third diameter D3 measured near the second end of the container 100 is larger than the second diameter D2, and accordingly, also larger than the first diameter D1.

Figure 6:
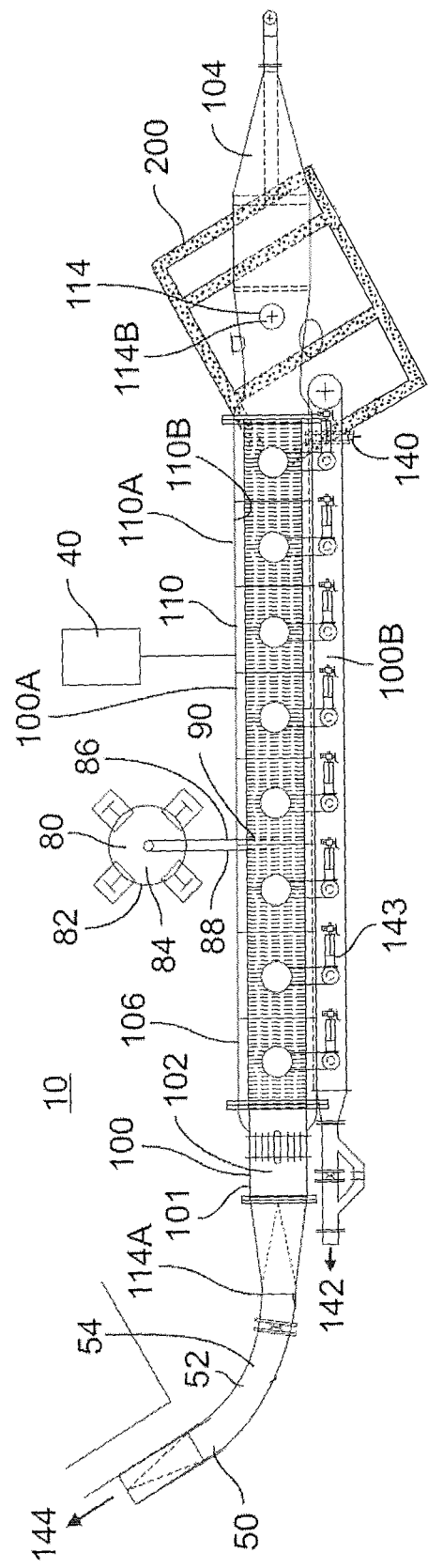
FIG. 6 is a top view of an embodiment of a system according to the present invention including a conduit, a first container, and a receiving basin.

Additional embodiments of the present invention may include a conduit 50 leading to the inlet 122 as illustrated in FIG. 6. The embodiment of FIG. 6 also includes a container space split into a first container area 100A and a second container area 100B, as discussed in more detail below.

Certain embodiments of a system 10 of the present invention may include a conduit 50, a plurality of containers 100 (e.g., any number two or higher), and a receiving basin 200. A conduit 50 may include a number of conduit arms 52 positioned to deliver water or water contents to a container 100. In the embodiment illustrated in FIG. 7, a conduit 50 includes a first conduit arm 54, a second conduit arm 56, and a third conduit arm 58. A conduit 50 may include a conduit wall 60 configured to partially enclose water contents and to permit water contents to be transferred from a river into the container 100. In certain embodiments, a conduit 50 may include a conduit valve 62 positioned to permit control over the flow of water contents into one or more containers 100.

Certain embodiments of the system 10 may include a plurality of containers 100 such as a first container 101, a second container 103, and a third container 105. Certain embodiments of a container 100 may be configured to permit the flow of water from a first end area 102 to a second end area 104 of the container 100. A container 100 may include an upper container area 106 and a lower container area 104. A container 100 may include one or more container walls 110. Certain embodiments of a container wall 110 include container wall sections 111, which may be attached to one another via attachment elements. Container wall sections 111 are configured to permit inclusion of a specific size, shape, material, or other attribute into the container wall 110. In certain embodiments, a container wall 110 is continuous and does not include container wall sections 111. Certain embodiments of a container wall 110 may include an outer container wall 110A and inner container wall 110B. An inner container wall 110B defines a container space 112 within the container 100. Certain embodiments of a container wall 110 may include one or more container openings 114 that permit the passage of air and water into or out of the container 100. A container opening 114 may be defined by a container rim 116. In certain embodiments, a valve 128 is positioned relative to a container opening 114 to be capable of causing the valve to be positioned in a closed setting or an open setting.

Figure 8:
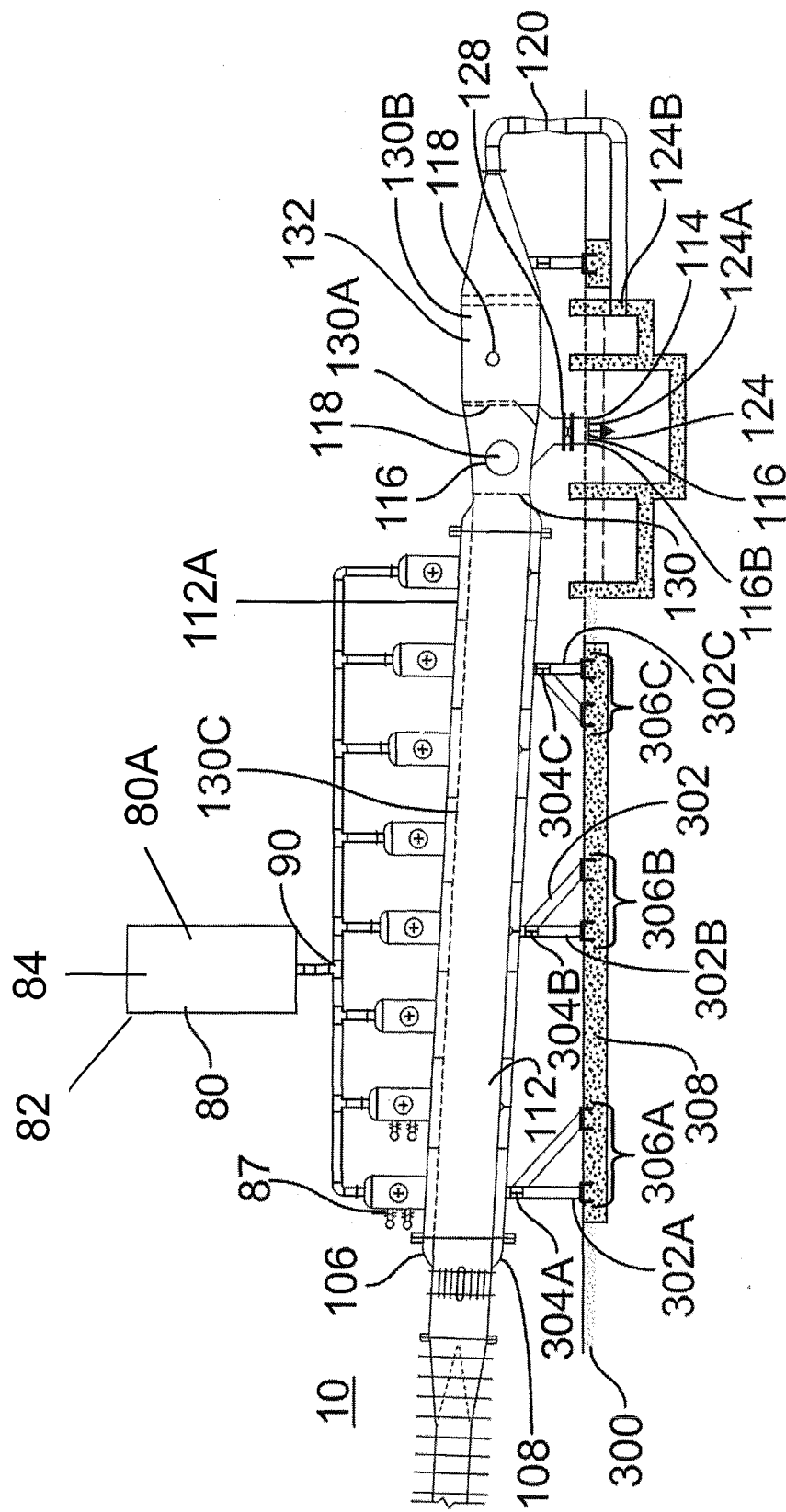
FIG. 8 is a side view of an embodiment of a container and a receiving basin.

In the embodiment illustrated in FIG. 8, a container rim 116 may be attached to a transparent coverage component 118 configured to permit light to enter the container space 112.

In certain embodiments, container openings 114 may be positioned at or near the first end area 102 of the container and at or near a second end area 104 of a container. Such container openings 114 are termed a "first end container opening" 114A and "second end container opening" 114B for purposes of this application and the respective container rims 116 that define each are termed the "first end container rim" 116A and the "second end container rim" 116B.

Figure 7:
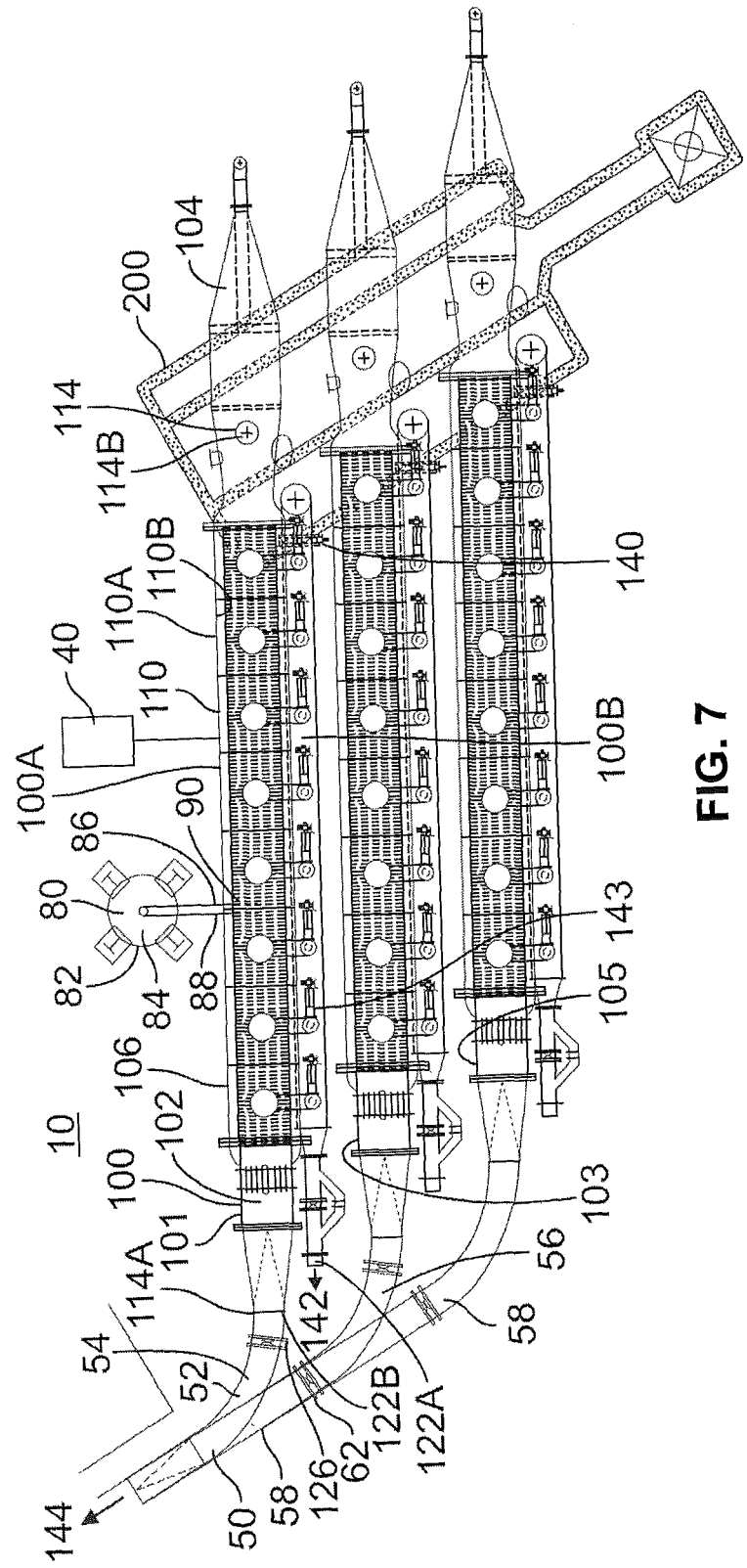
FIG. 7 is a top view of an embodiment of a system according to the present invention including a conduit, a primary container, secondary container, tertiary container, and receiving basin.

Certain embodiments of a container 100 may include an inlet 122 and an outlet 124 as shown in FIG. 6 and FIG. 7. In certain embodiments, an inlet valve 126 may be positioned relative to the inlet 122 such that the inlet 122 may enter an open state or a closed state to permit entry or block entry of water contents. An outlet valve 128 may be positioned relative to the outlet 124 such that the outlet 124 may enter an open state or a closed state to permit entry or block entry of water contents.

Certain embodiments of the present invention include a separator 130. In the embodiment illustrated in FIG. 8, a first separator 130A is positioned relative to a first outlet 124A such that water contents that cannot pass through the separator 130 may be released through a first outlet 124A. A second outlet tube 120 and second outlet 124B permits exit of water contents that are capable of passing through the separator 130. The embodiment shown in FIG. 8 also includes a secondary separator 130B. The container space 112 between the first separator 130A and second separator 130B forms an organism storage area 132. The embodiment shown in FIG. 8 also includes a tertiary separator 130C positioned in the upper container space 112A.

Certain embodiments of a container may include a washing component 140. A washing component 140 may be configured to emit water or a cleaning solution.

In certain embodiments, a container 100 may be positioned to receive water contents from two or more sources. Such sources may include, for example, a filtered source 142 and a non-filtered source 144. A filtered source 142 may include a penstock, water-holding unit, or any other source in which water is contained and may be filtered or treated before entering the container. A non-filtered source 144 may include a body of water that is not filtered or treated for purposes related to the present invention system and methods.

Figure 9:
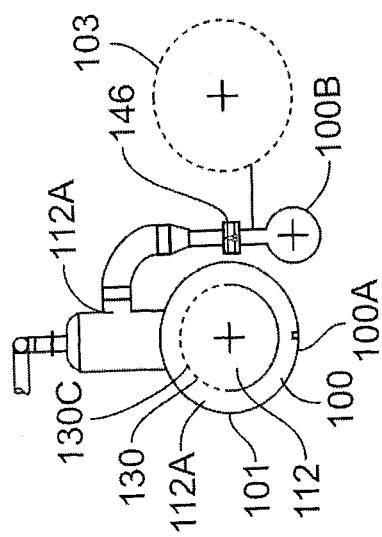
FIG. 9 is a front view of an embodiment of a container that includes a first container area and a second container area.

Certain embodiments of a container 100 positioned to receive water from two sources may also be configured for this purpose. For example, embodiments of a container wall 110 may form a first container area 100A and a second container area 100B such that the contents of a first container area 100A may be kept apart from the contents of a second container area 100B. In certain embodiments, the first container area 100A and second container area 100B include a shared space 112A such that the contents of each area may be combined in certain circumstances such as when the water level rises. In the embodiment illustrated in FIG. 9, the third separator 130C is positioned in the shared space 112A above the container partition wall 110C such that only water contents that can pass through the selectively permeable surface of the separator 130C will pass from the first container area 100A to another container area. In certain embodiments, a flow regulating outlets and respective flow regulating valves 143 are positioned to permit control over the speed of water flow between a first container area 100A and a second container area 100B.

In the embodiment illustrated in FIG. 7, a first container area 100A and a second container area 100B include first inlet 122A and a second inlet 122B, respectively. A first inlet 122A may include a first inlet valve 126A, and a second inlet 122B includes a second inlet valve 126B. Similarly, a first container area 100A and a second container area 100B include first outlet 124A and a second outlet 124B, respectively. A first outlet 124A may include a first outlet valve 128A, and a second inlet 124B includes a second outlet valve 128B.

In certain embodiments, the system 10 of the present invention may include a pressurizer 80 such as an air chamber 80A. An air chamber 80A is sized, shaped, and positioned to permit control over the air pressure in the container space 112. In certain embodiments, a container wall 110 is sized and shaped to include an air chamber 80A. In other embodiments, an air chamber 80A is a separable component that may be positioned to meet with or attach to a container 100. In such embodiments, an air chamber includes an air chamber wall 82 that defines an air chamber space 84.

An air chamber wall 82 also may include a pressure control mechanism 85 such as air bleedoff openings 86 defined by an air chamber rim 88. An air chamber rim 88 may be sized and shaped to meet with or attach to a container rim 116. In embodiments in which an air chamber rim and a container rim are configured to attach to one another, such attachment may be formed by an attachment element 90 such as welding, screws, rivets, nuts, bolts, snaps, complementary components, adhesives, seal, neoprene seal, gasket, or a means of permitting an airtight connection known in the art. Certain embodiments of an air chamber wall 82 also may include additional air bleedoff openings 86 sized and shaped to meet with or attach to other components such as a compressor component, pressure sensor component, or an air bleedoff valve 87.

As shown in FIG. 8, embodiments of the system 10 of the present invention may be positioned near a stable base structure 300 such as a river bottom or an obstruction. In certain embodiments, any component of the system 10 including a container 100, receiving basin 200, or air chamber 80A may be connected to a stable base structure 300 via one or more support elements 302. The embodiment illustrated in FIG. 8 includes a first support element 302A, a second support element 302B, and a third support element 302C. In certain embodiments, the support elements 302 are connected to container 100 via a first container connector 304A, second container connector 304B, and third container connector 304C. In certain embodiments, the support elements 302 are connected to a platform 308 in the stable base structure 300 via a first base connector 306A, second base connector 306B, and third base connector 306C. A connector 304 may be an adhesive, screw, nail, bolt, nut, rivet, tie, welding, or anything else configured to connect a support element 302 to other components of the system 10 of the present invention.

Figure 10B:
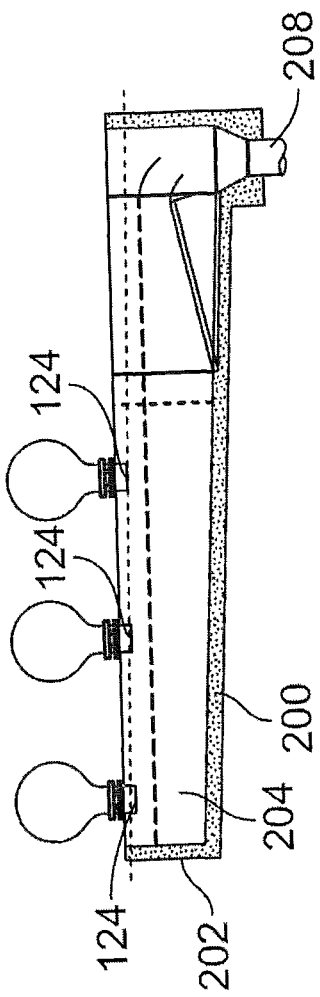
FIG. 10B is a side view of an embodiment of a receiving basin and an outlet of a container.
Figure 10A:
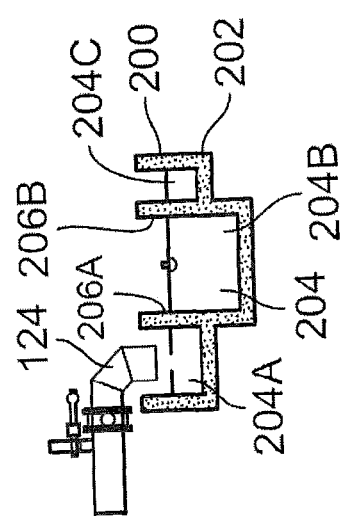
FIG. 10A is a second side view of an embodiment of a receiving basin and three outlets from one or more containers.

As shown in FIG. 10A, and FIG. 10B, certain embodiments of the system 10 may include a receiving basin 200. A receiving basin 200 may be positioned relative to an outlet 124 to receive water contents released from an outlet 124. Certain embodiments of a receiving basin 200 may include a receiving basin wall 202, which may be configured to form a compartment area 204. Certain embodiments of a receiving basin wall 202 may include a first basin divider wall 206A and a second basin divider wall 206B such that the compartment area 204 may be divided into two or more compartment areas

204. Such embodiments may include a first compartment area 204A, second compartment area 204B, third compartment area 204C, or any number of compartment areas 204. Certain embodiments of a receiving basin 200 also include a discharge component 208 configured to permit the contents of the receiving basin 200 to discharge from the receiving basin 200.

Certain embodiments of the system and methods of the present invention include one or more instrument components 40. Instrument components 40 may include any instrument known in the art that is configured to assess or monitor some part of the system 10 or the whole system 10.

Figure 11:
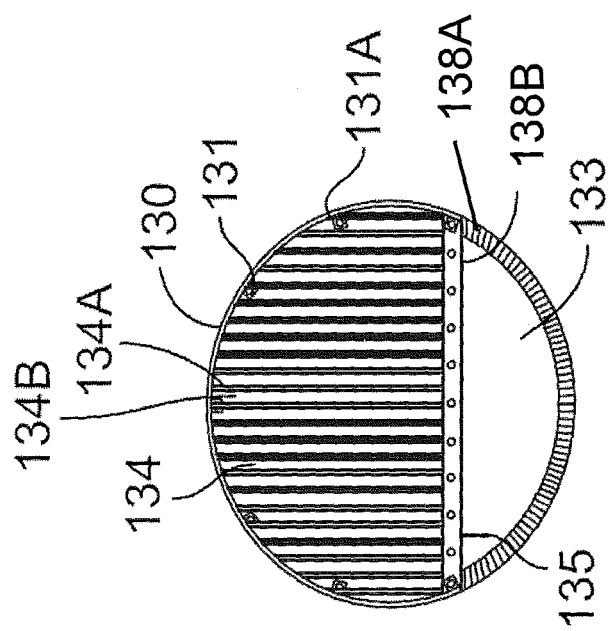
FIG. 11 is a section view of an embodiment of a separator.

FIG. 11 includes an illustration of an embodiment of a separator 130. In this embodiment, a separator 130 may be sealed to the container wall 100 via a seal element. A seal element 131 includes a bolt, screw, nut, washer, seal insert, flexible bristled brush seal, adhesive, welding, or any other appropriate seal for the system 10 that is known in the art. This embodiment of a separator 130 includes a frame 138, a flap component 133, and a porous section 134. A flap element 133 is configured to be maneuverable such that when the flap component 133 is closed, no water contents may pass through the flap component 133 and when the flap component 133 is open, water contents may pass through the separator space not covered by the flap component 133. A flap component 133 may be connected to the frame 138 by a movable joinder component 135, such as a hinge mechanism. The frame 138 may include an outer frame element 138 and an inner frame element 138B. A porous section 134 of the separator 134 is configured or made from a material such that certain water or water contents may pass through it without moving the porous section 134. In the illustrated embodiment, the porous section 134 includes alternating bars 134A and open sections 134B. The bars 134A may be positioned to exclude passage of large water contents such as debris and aquatic predators.

FIG. 12A and FIG. 12B includes an illustration of an embodiment of a separator 130 in a segment of a container. In this embodiment, the separator 130 includes a slot panel 136 that is positioned with the support of a grid 137. A slot panel 136 is configured to include small slots through which water may pass, but many water contents cannot pass. The separator 130 is sealed to the container wall 110 via seal elements 131. In FIG. 12A, the flap component 133 is closed thereby blocking any water contents from passing below the inner frame element. In FIG. 12B, the flap component 133 is open, thereby permitting water contents to pass through the space below the inner frame element.

Figure 13B:
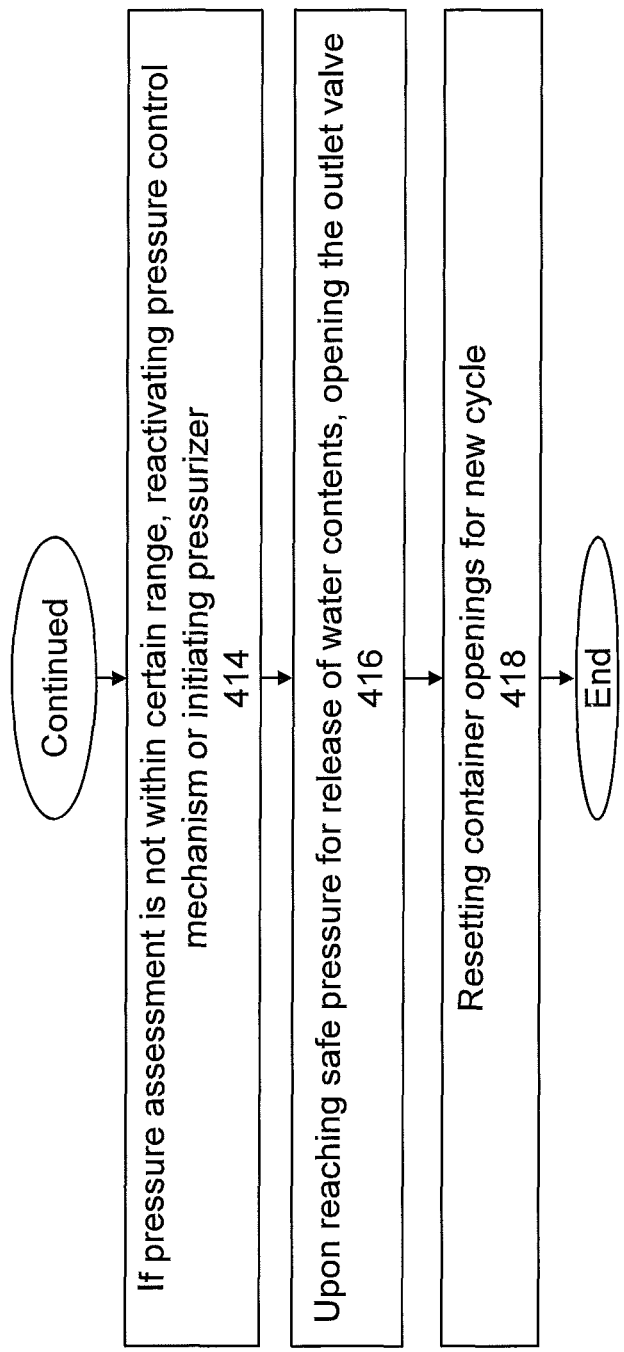

FIG. 13A and FIG. 13B illustrate a flow chart that includes steps of an embodiment of the methods 400 according to the present invention. These steps may be executed using, for example, an embodiment of a system including a container having an inlet, an outlet, an inlet valve, and an outlet valve, pressure sensor component, pressurizer, and a pressure control mechanism. At the start, the container may be closed-off such that all container openings are closed and the container defines an entirely enclosed container space. At step 402, the system is positioned relative to a body of water such that the container may receive from a body of water certain water contents may include not only water, but also, fish, other aquatic organisms, other organic matter, and inorganic matter, and other from the body of water. In this positioning step, the system may be positioned so that it is submerged entirely, submerged partially, or may be entirely out of, but adjacent to, the body of water.

At step 404, the inlet valve is moved to open the inlet, such that water contents including water, fish, and other aquatic organisms may enter into the container. As the water contents enter the container, the air pressure may rise in the container.

At step 406, the pressure control mechanism may be activated such that the pressure level in the container may be decreased at an appropriate rate. In certain embodiments, a pressure control mechanism may include an air bleedoff valve. In such embodiments, this decreasing pressure step may include opening an air bleedoff valve to permit the release of air from the container space.

Upon a certain event, e.g., a pre-selected amount of time has passed or a certain pressure is reached, the pressure control mechanism is deactivated, and accordingly ceases permitting the pressure to decrease at step 408. In such a ceasing step, an air bleedoff valve may be closed to stop the release of air from the container space. Immediately or soon after the pressure control mechanism ceases the pressure decrease, the inlet valve may be shifted to close or block the inlet such that water contents cannot enter into the container at step 410.

At step 412, a pressure sensor may assess the air pressure in the container space over time. If the sensor detects that the air pressure level is not within an acceptable range for maintaining fish and other water contents or releasing water contents, the pressure sensor reactivates the pressure control mechanism (to lower pressure) or initiates the pressurizer (to increase pressure) at step 414.

When an appropriate pressure level is reached for optimized release of fish and water contents, the position of the outlet valve is adjusted to open the outlet such that water contents may exit from the container at step 416. An air bleedoff outlet or other pressure control mechanism may remain activated (e.g., open air bleedoff valve, as positioned in step 414) while the water contents are released through an outlet to maintain an optimized pressure during exit of water contents. At step 418, the container is reset and any open valves are moved to a closed position. The steps end and the system is ready to start another possible cycle.

Figure 14A:
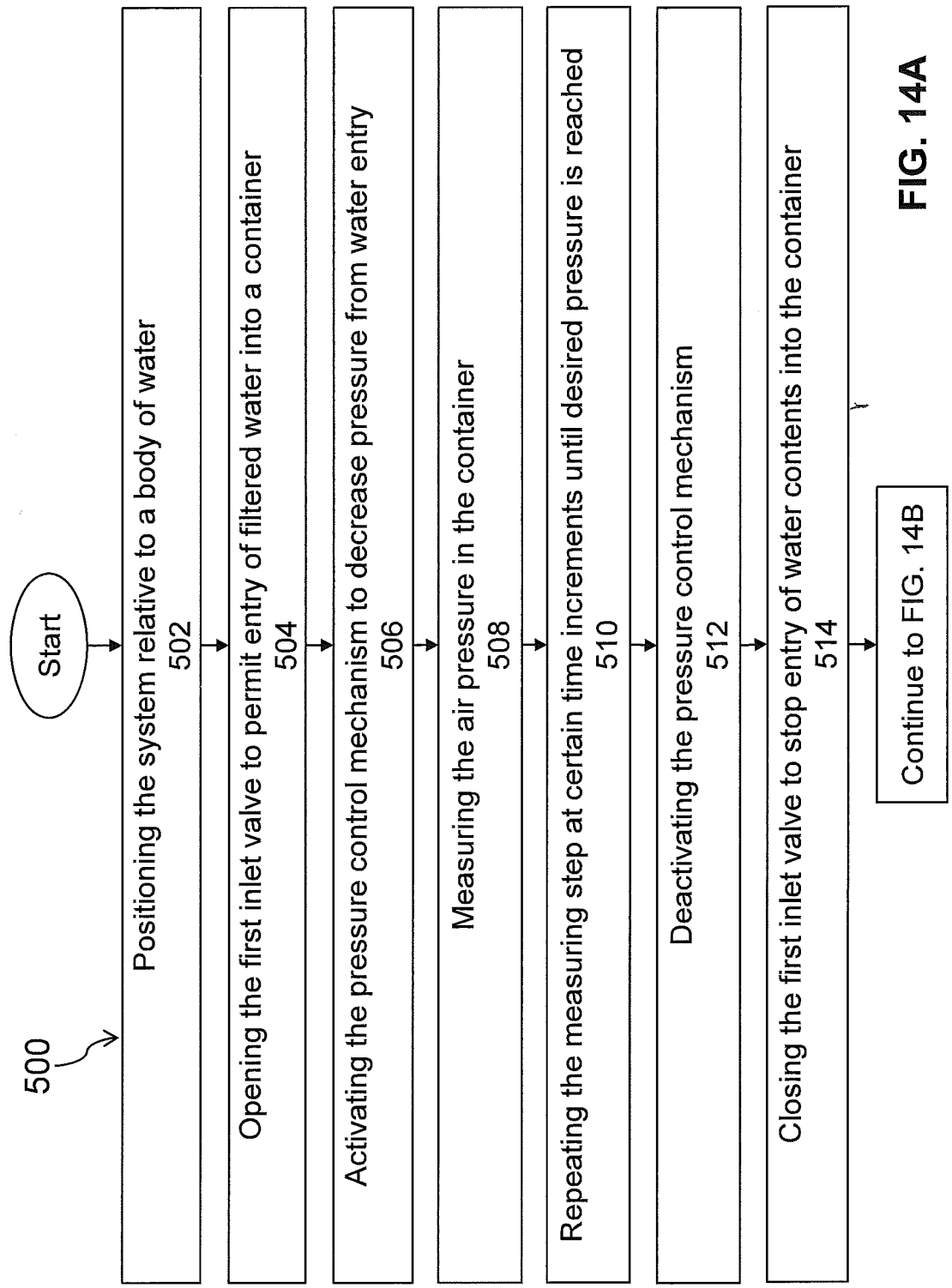
Figure 14B:
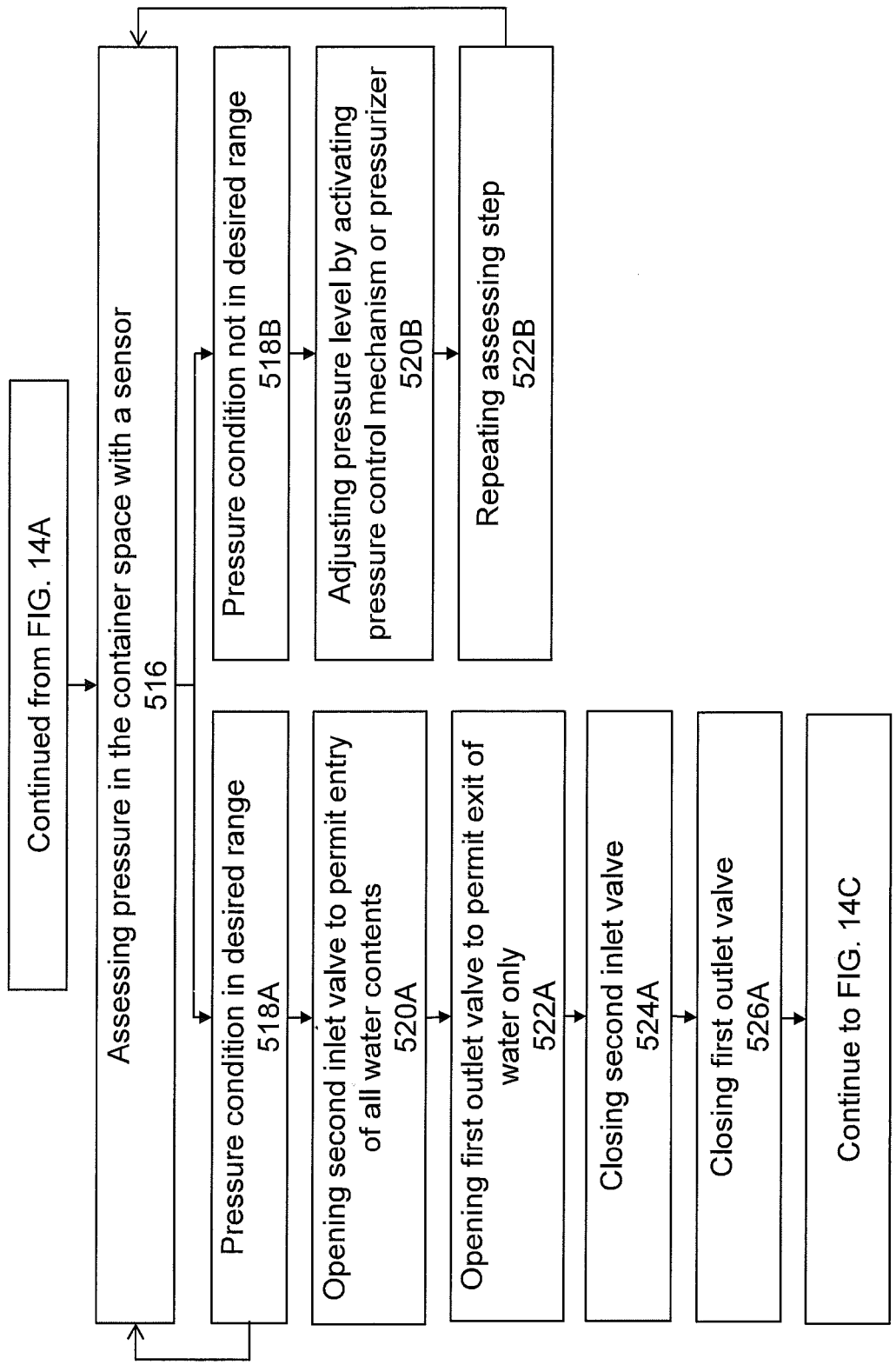

FIG. 14A, FIG. 14B, and FIG. 14C illustrate a flow chart that includes steps of another embodiment of the methods according to the present invention. These steps may be practiced on an embodiment of a system including a container having additional components relative to the container used in the method described in FIGS. 13A and 13B. Specifically, in certain embodiments, the container includes container openings, specifically, a first inlet, a second inlet, a first outlet, a second outlet, and a valve and controller component for each inlet or outlet, a pressure sensor component, container pressurizer, and a pressure control mechanism.

At the start, the container may be closed-off such that all container openings are closed and the container defines an entirely enclosed container space. At step 502, the system is positioned relative to a body of water such that the container may receive from a body of water certain water contents may include not only water, but also, fish, other aquatic organisms, other organic matter, and inorganic matter, and other from the body of water. In this positioning step, the system may be positioned so that it is submerged entirely, submerged partially, or may be entirely out of, but adjacent to, the body of water.

At step 504, the first inlet valve is moved to open the first inlet, such that water contents may enter into the container. Such a first inlet may be sized and shaped to selectively permit entry of only certain water contents into the container space. For example, a first inlet may be small enough to permit entry of only water and microorganisms, and to exclude entry of fish, into the container space. Such a first inlet may be positioned to receive water from a penstock or other filtered source.

As the water enters the container through the first inlet, the air pressure may rise in the container space. At step 506, the pressure control mechanism may be activated such that the pressure level in the container may be decreased.

In certain embodiments, this decreasing pressure step includes opening an air bleedoff valve or a water release valve to permit the release of air or water from the container space. The pressure control mechanism may vary the rate of decrease or increase in pressure as necessary.

At step 508, a pressure sensor may measure the pressure in the container space. The measuring step 508 may be repeated until desired pressure is reached, such as a generally equalized pressure compared to the ambient pressure around the inlet or outlet 510. Then, the pressure sensor sends a first instruction to the pressure control mechanism to deactivate the pressure control mechanism at step 512. In such a step, an air bleedoff valve or water release valve may be closed to cease permitting the release of air or water from the container space. At step 514, the first inlet valve controller is closed to stop entry of water contents into the container via the inlet.

Typically, after these steps, the entire container space is enclosed and at a stable pressure level. However, to ensure the container space is within a desired pressure range to receive aquatic organisms, a pressure sensor again may assess the air pressure in the container space at step 516. If the sensor detects that the air pressure measurement is not within the desired pre-determined range 518B, a pressure control mechanism is activated to adjust the pressure level at step 520B. The measuring step of 516 may be repeated until a desired pressure level is reached.

Upon reaching a desired pressure level, the pressure sensor sends an instruction to open the second inlet valve at step 520A. A second inlet valve may be sized and shaped to permit entry of a wide variety of water contents including large fish, small fish, and other aquatic organisms. At the same time or close in time to step 520A, the first outlet valve controller causes movement of the first outlet valve such that the first outlet is open to permit exit of water contents at step 522A. In certain embodiments, the first outlet, or a series of first outlets, are configured to selectively permit exit of only water and very small organisms, and not permit the exit of fish or other similarly sized water contents. This generally simultaneous entry of water contents and exit of water only permits pressure regulation in the container space.

After a pre-determined amount of time has passed or capacity of the container is reached, the second inlet valve is maneuvered to close the second inlet at step 524A, and simultaneously or very close in time, any first outlet valves are modified to close all first outlets at step 526A.

Typically, after these steps, the entire container space is enclosed again at a stable pressure level and includes fish in the container space. However, to ensure the container space is within a desired pressure range, a pressure sensor again may evaluate the air pressure in the container space at step 528. If air pressure measurement is not within a pre-determined range 530B, the pressure sensor sends an instruction to the pressure control mechanism or pressurizer to adjust the pressure level at step 532B. In such step, the pressure control mechanism permits decrease in pressure or the pressurizer permits increase in pressure. The evaluating step of 528 and adjusting step of 530B may be repeated until a desired pressure level/range is reached. Upon reaching a desired air pressure level/range such as ambient pressure around an outlet 530A, an additional instruction is sent to open the second outlet valve at step 532A. At step 532A, the second outlet valve controller may reposition the second outlet valve such that the second outlet is open to permit release of water contents including water, fish, and other aquatic organisms. After the water contents have been completely (or almost completely) released from the container, any open valves, including at least the second outlet valve, are moved to a closed position.

In certain embodiments, an additional step may take place in which a separator may change position (e.g., rotate or retract a component) to permit additional water contents to have access to the second outlet, and accordingly, the second outlet may open and close a second time to permit release of separated water contents.

If necessary, the system is reset for a new cycle 536. The resetting step may include opening or closing valves, cleaning components of the system, or other steps configured to improve next cycle.

In certain embodiments in which the system has a plurality of containers, the cycle of each container may be timed to maximize efficiency. Certain of such embodiments permit generally continuous or almost continuous flow of water contents into some container. For example, the cycles may be staggered such that when at least one container is always open to receive water contents on a rotating basis.

While the disclosure is susceptible to various modifications and alternative forms, specific exemplary embodiments thereof have been shown by way of example in the drawings and have herein been described in detail. It should be understood, however, that there is no intent to limit the disclosure to the particular embodiments disclosed, but on the contrary, the intention is to cover all modifications, equivalents, and alternatives falling within the scope of the disclosure as defined by the appended claims.

What is claimed is:

1. A system for selectively permitting aquatic organisms in a water flow to safely bypass an obstruction by controlled dissipation of pressure in the water flow, comprising:
    a primary container including a container wall constructed and configured to define a container space1 through which the water flow may pass, said container wall includes a first container opening configured as a first inlet and a second container opening configured as a first outlet;
    said primary container including a flow control element configured to gradually lessen rate of the water flow in said primary container;
    a container pressurizer functionally separate from and configured to permit pressurization of said container space; and
    a pressure control mechanism configured to permit control over pressure level in said container space and intended to prevent harm to the aquatic organisms in the water flow during transition through the container;
    said pressure control mechanism separated from the water flow containing the aquatic organisms by a separator, said separator configured to selectively prevent the aquatic organisms from coming into contact with at least said container pressurizer, said pressure control mechanism, and said first outlet during passage in the water flow through the system.

2. The system of claim 1, wherein said container pressurizer is a water standpipe.

3. The system of claim 1, wherein said container pressurizer is a pressure vessel with hydraulic fluid.

4. The system of claim 1, wherein said container pressurizer is a piston and cylinder device.

5. The system of claim 1, wherein said container pressurizer is an air chamber.

6. The system of claim 1, wherein said pressure control mechanism is an air bleedoff element.

7. The system of claim 1, wherein said pressure control mechanism is a water discharge element.

8. The system of claim 1, wherein said pressure control mechanism is a hydraulic cylinder.

9. The system of claim 1, wherein said pressure control mechanism is a compressor element.

10. The system of claim 1 wherein said separator is configured to be selectively permeable, and positioned relative to said outlet to permit control over which size of the aquatic organisms may pass through the system and are released through said outlet.

11. The system of claim 10, wherein said separator is comprised of a physical barrier selected from the following group consisting of a filter, a slotted screen, a perforated screen, a mesh screen, sieve, bar rack, or strainer arrangement.

12. The system of claim 10, wherein said separator is comprised of a porous section, a flap element, and a frame element including an outer frame element and an inner frame element, wherein said flap element is connected to said inner frame element via a movable joinder component such that said flap element is maneuverable to an open position to permit passage of the water flow and water contents and entirely block passage of the water flow and the water contents depending on the whether said first outlet is open or not and wherein said porous section is configured to permit selective passage of the water contents.

13. The system of claim 10, wherein said separator is comprised of an energy barrier selected from the group consisting of a sound barrier or an electrical barrier.

14. The system of claim 1, wherein said first outlet is positioned to permit release of water contents that had not passed through said separator, and wherein said system of claim 1 is further comprised of a second outlet positioned to permit release of the water contents that passed through said separator.

15. The system of claim 1 further comprised of a receiving basin configured to receive the aquatic organisms and water from said outlet to permit evaluation or collection of the aquatic organisms.

16. The system of claim 1 wherein said first inlet is positioned to permit said container to receive the water from a non-filtered source, and wherein the system of claim 1 is further comprised of a second inlet positioned to permit said container to receive the water from a filtered source.

17. The system of claim 16, wherein the filtered source is a penstock.

18. The system of claim 1 further comprised of a conduit configured to transport water contents to said first inlet.

19. The system of claim 1 further comprising:
a secondary container including a secondary container wall constructed and configured to define a secondary container space through which the water flow may pass, said secondary container wall including a first secondary container opening configured as a first secondary inlet and a second secondary container opening configured as a first secondary outlet;
said secondary container including a secondary flow control element configured to gradually lessen rate of the water flow in said secondary container;
a secondary container pressurizer functionally separate from and configured to permit the pressurization of said secondary container space; and
a secondary pressure control mechanism configured to permit control over the pressure level in said secondary container space and intended to prevent harm to the aquatic organisms in the water flow during transition through the secondary container;
said secondary pressure control mechanism separated from the water flow containing the aquatic organisms by a secondary separator configured to selectively prevent the aquatic organisms from coming into contact with at least said secondary container pressurizer, said secondary pressure control mechanism, and said first secondary outlet during passage in the water flow through the system;
said primary container and said secondary container configured to function in staggered cycles that are not simultaneous, thereby improving efficiency of the system.

20. A method for moving organisms safely around an aquatic obstruction in a body of water, comprising the steps of:
positioning relative to the body of water a system having a container including a container wall which defines a container space, said container wall including a first inlet having a first inlet valve and a first outlet having a first outlet valve, a separator between the first inlet valve and the first outlet valve, a container pressurizer configured to permit pressurization of the container space, and a pressure control mechanism configured to permit control over pressure level in the container space and to allow the organisms to safely move through the container;
opening the first inlet valve and the first outlet valve to permit entry of water from the body of water and to establish flow of the water into and through the container to the first outlet valve;
separating the organisms through the use of the separator to keep the organisms from passing through the first outlet valve;
closing the first inlet valve and the first outlet valve to stop the water flow;
activating the pressure control mechanism to decrease the pressure level in the container;
deactivating the pressure control mechanism upon reaching the pressure level that is desired;
releasing the organisms from the system;
using the container pressurizer to introduce a new flow of water from the body of water into the container; and
deactivating the container pressurizer once the desired pressure level is attained.

\* \* \* \* \*